United States Patent
LaVigne et al.

(10) Patent No.: US 10,275,189 B2
(45) Date of Patent: Apr. 30, 2019

(54) METHOD AND APPARATUS FOR PRINTING IN A DISTRIBUTED COMMUNICATIONS NETWORK

(71) Applicant: Mimeo.com, Inc., New York, NY (US)

(72) Inventors: Toby LaVigne, Portsmouth, NH (US); Christopher David Wells, Ashburnham, MA (US); Aron Blume, Newton, MA (US)

(73) Assignee: Mimeo.com, Inc., New York, NY (US)

( * ) Notice: Subject to any disclaimer, the term of this patent is extended or adjusted under 35 U.S.C. 154(b) by 0 days.

(21) Appl. No.: 14/951,545

(22) Filed: Nov. 25, 2015

(65) Prior Publication Data

US 2016/0077769 A1    Mar. 17, 2016

Related U.S. Application Data

(63) Continuation of application No. 12/977,417, filed on Dec. 23, 2010, now Pat. No. 9,229,662, which is a
(Continued)

(51) Int. Cl.
*G06F 3/12* (2006.01)
*H04N 1/00* (2006.01)
(Continued)

(52) U.S. Cl.
CPC .......... *G06F 3/1205* (2013.01); *G06F 3/1203* (2013.01); *G06F 3/126* (2013.01); *G06F 3/1285* (2013.01); *G06F 3/1296* (2013.01); *G06Q 10/06* (2013.01); *H04N 1/00244* (2013.01); *H04N 1/6033* (2013.01); *Y04S 10/54* (2013.01)

(58) Field of Classification Search
CPC ........ G06T 11/60; G06T 22/10; G06F 3/1203
See application file for complete search history.

(56) References Cited

U.S. PATENT DOCUMENTS 5,287,194 A    2/1994  Lobiondo
5,974,441 A    10/1999 Rogers et al.
(Continued)

OTHER PUBLICATIONS

Burleson, M., U.S. Appl. No. 12/977,417, Notice of Allowance, dated Nov. 5, 2015, 14 pages.
(Continued)

*Primary Examiner* — King Y Poon
*Assistant Examiner* — Michael L Burleson
(74) *Attorney, Agent, or Firm* — LaBatt, LLC

(57) ABSTRACT

A method and system is provided for printing jobs received from enterprise customers through a global printing network. One aspect relates to an architecture that interfaces customers, communication service firms (CSFs), and downstream digital print service providers (PSPs) in a global communications network. Such an architecture permits last-mile production functions that allow the distribution of print jobs to be optimized, containing costs, maintaining quality, and performing billing functions that improve the quality of such networks and make a global print network feasible. As a result, Enterprise customers benefit from lower costs and global sourcing while print service providers and graphics service firms benefit from increased revenue due to increased utilization of the overall global network.

20 Claims, 14 Drawing Sheets

Related U.S. Application Data continuation of application No. 11/820,133, filed on Jun. 18, 2007, now abandoned, which is a continuation of application No. 11/698,270, filed on Jan. 25, 2007, now abandoned.

(51) Int. Cl.
*H04N 1/60* (2006.01)
*G06Q 10/06* (2012.01)

(56) References Cited

U.S. PATENT DOCUMENTS

| | | | |
|---|---|---|---|
| 5,995,721 | A | 11/1999 | Rourke et al. |
| 6,397,197 | B1 | 5/2002 | Gindlesperger |
| 6,535,294 | B1 | 3/2003 | Arledge, Jr. et al. |
| 6,650,433 | B1 | 11/2003 | Keane et al. |
| 7,320,510 | B2 | 1/2008 | Nakamura et al. |
| 2002/0019786 | A1 | 2/2002 | Gonzalez et al. |
| 2002/0026379 | A1 | 2/2002 | Chiarabini et al. |
| 2002/0046129 | A1 | 4/2002 | Nakagawa |
| 2002/0078130 | A1* | 6/2002 | Thornton ............ G06F 9/5055 709/201 |
| 2002/0140985 | A1 | 10/2002 | Hudson |
| 2002/0159083 | A1 | 10/2002 | Arai et al. |
| 2003/0053124 | A1 | 3/2003 | Lijima et al. |
| 2004/0008368 | A1* | 1/2004 | Plunkett ............ G06F 3/1204 358/1.15 |
| 2004/0039647 | A1 | 2/2004 | Roche |
| 2005/0190400 | A1* | 9/2005 | Redd ............ G03D 15/005 358/1.15 |
| 2006/0158672 | A1* | 7/2006 | Kondo ............ H04N 1/6055 358/1.9 |
| 2007/0019228 | A1 | 1/2007 | Rai et al. |
| 2007/0195355 | A1 | 8/2007 | Banton |
| 2008/0180729 | A1 | 7/2008 | LaVigne et al. |
| 2009/0201533 | A1* | 8/2009 | Ray ............ G06Q 10/08 358/1.15 |

OTHER PUBLICATIONS

Burleson, M., U.S. Appl. No. 12/977,417, Non-Final Office Action, dated May 28, 2015, 20 pages.
Burleson, M., U.S. Appl. No. 12/977,417, Final Office Action, dated Jan. 16, 2015, 38 pages.
Burleson, M., U.S. Appl. No. 12/977,417, Non-Final Office Action, dated May 14, 2014, 13 pages.
Burleson, M., U.S. Appl. No. 12/977,417, Final Office Action, dated Sep. 12, 2013, 11 pages.
Burleson, M., U.S. Appl. No. 12/977,417, Non-Final Office Action, dated Feb. 20, 2013, 7 pages.
Burleson, M., U.S. Appl. No. 12/977,417, Final Office Action, dated Nov. 9, 2012, 17 pages.
Burleson, M., U.S. Appl. No. 12/977,417, Non-Final Office Action, dated Nov. 8, 2011, 17 pages.
Burleson, M., U.S. Appl. No. 11/820,133, Non-Final Office Action, dated Jun. 25, 2010, 8 pages.

* cited by examiner

METHOD AND APPARATUS FOR PRINTING IN A DISTRIBUTED COMMUNICATIONS NETWORK

RELATED APPLICATIONS

This application is a continuation of U.S. patent application Ser. No. 12/977,417, filed on Dec. 23, 2010, entitled "METHOD AND APPARATUS FOR PRINTING IN A DISTRIBUTED COMMUNICATIONS NETWORK," which is a continuation of U.S. patent application Ser. No. 11/820,133, filed on Jun. 18, 2007, entitled "METHOD AND APPARATUS FOR PRINTING IN A DISTRIBUTED COMMUNICATIONS NETWORK," which is a continuation of U.S. patent application Ser. No. 11/698,270, filed on Jan. 25, 2007, entitled "METHOD AND APPARATUS FOR PRINTING IN A DISTRIBUTED COMMUNICATIONS NETWORK." Each of these applications is incorporated herein by reference in its entirety.

BACKGROUND OF THE INVENTION

1. Field of the Invention

The field of the invention relates to digital printing systems, and more specifically, to distributed printing systems coupled by a communications network.

2. Discussion of the Related Art

Fortune 1000 companies spend approximately $800B annually to fuel their print communications supply chain, delivering projects ranging from internally published training manuals, to branded marketing collateral. Generally, the supply chain spans a set of functions including creative, administration, warehousing and distribution. Communications and marketing professionals are continuously being tasked with finding more effective methods to drive a company's message. In general, such professionals seek what is termed in the art as an improved Return on Communications Investment (ROCI).

There is tremendous potential for the world's largest enterprises to drastically improve the effectiveness of their print communications supply chain and, at the same time, reduce supply chain costs by 25%-40% with the adoption of distributed print on demand (POD). However, it is appreciated that there does not currently exist one single printer that has the necessary work flow management capability, the global presence, or the production capacity to fully deliver these benefits.

Communication Service Firms (CSFs)

For many years, innovative companies have sought to solve the printing problems of the Enterprise with digital printing technology. Unfortunately, these companies have not been able to unlock the true returns from implementing a real-time globally distributed digital print platform. Most conventional digital print service providers (PSPs) produce printed documents from a central location and thus incur significant shipping and handling costs. In addition, the manual nature of the client interface is expensive and time consuming for users to operate.

Print Service Providers (PSPs)

Currently, it is appreciated that the world's output capacity for digital print and other forms of printed communications is distributed in a manual manner amongst tens of thousands of companies, most of which are small to mid-sized companies, and are generally privately-held. The single biggest driver of a PSP's margin is their capacity utilization. Unfortunately, it is appreciated that inefficiencies in the current value chain lead to low utilization, and thus lower profits. It is appreciated that the total digital print utilization globally is very low, perhaps below 40% of capacity. Thus, it would be beneficial to provide a service that is capable of more effectively managing print services in a global marketplace.

SUMMARY OF THE INVENTION

According to one aspect of the present invention, a global print platform is provided that enables commercial printers and graphic design firms to provide last-mile print production for their enterprise clients. In such a global system, local providers are transformed into global providers, permitting them to fulfill printing requests in an automated fashion. By eliminating the large capital investment necessary to create a private global print network, these local providers are able to leverage their excess capacity to meet global production needs. According to one embodiment of the present invention, an architecture is provided that permits local providers to cost-effectively produce print products for consumers of a global print network.

According to one aspect of the present invention, a platform is provided that leverages existing printing systems to develop a consistent printing platform that also minimizes costs. According to various aspects of the present invention, it is appreciated that the establishment of an effective global print platform faces various challenges including, without limitation:

Ensuring print quality among all of the disparate printing platforms that may be used to fulfill a particular job Optimizing price and costs of production across a large geographical area Allocation of jobs among resources of a global print network Integration of various unrelated systems Financial transactions conducted between large numbers of unknown international parties.

These are a few of the many issues that currently prevent mass corporate adoption of print on demand.

According to one aspect of the present invention, print service providers (PSPs) compete based on cost to perform a particular print job. In one embodiment, the global print platform is adapted to allocate jobs based on minimum cost, thereby saving companies money by using such a system. Such costs may be dependent on one or more parameters, such as, for example, shipping, production, labor or other costs specific to the PSP. For example, it is realized that a more distributed system that prints product in an optimum location (e.g., closest to the print product consumer) can be determined in order to minimize shipping costs. Further, other optimizations may be determined based on, for example, production costs, currency value, and other parameters.

According to another embodiment, the global print platform may be adapted to allocate jobs based on an availability of a print resource in the global network. For instance, in a global network having print resources operating at lower utilization may be employed to more adequately meet the needs of customers. With such a distributed system, capacity in the global network can be measured in real-time, and jobs can be allocated to the most appropriate resource(s). In this way, the utilization of the overall group of global printing resources is raised, as hot spots of demand for a particular print resource are minimized. Further, because the majority of excess utilization exists in local print service providers, a cost-effective way to reach such providers allows the global system to more effectively use such excess utilization.

Further, it is appreciated that current web-to-print systems (e.g., the well-known Printable System) allocate a single print resource to fulfill a single job. However, the job may be shipped to any one of a number of locations, and thus printing by a single PSP at a particular location may be inefficient, as additional shipping costs may need to be incurred to distribute the printed product to the necessary locations. Further, to reduce the time necessary to ship the final printed product, it is appreciated that the print location may be optimized depending on the location to which the final product is to be shipped. In one embodiment, a global distributed print architecture is provided that optimizes an allocation of portions of print job to multiple print locations. Such a distributed allocation provides a more efficient way of fulfilling the print job, and thus may provide lower costs to the Enterprise customer while also increasing the overall utilization of the global network by using multiple print locations to service print jobs in parallel. Further, customers may receive the final printed product more quickly, as ship times may be reduced by optimizing print locations.

According to another aspect of the present invention, it is appreciated that is difficult to ensure print quality among a number of different print resources that may fulfill a particular job. For instance, it is observed that there is no common color standard to which print products produced by disparate printing resources may be measured. Because of this, color quality cannot be ensured in a global print network. To this end, a color standard may be used to which printing resources in the global print network may be measured, and if necessary, corrected.

According to one aspect of the present invention, a method for printing in a distributed communications network is provided. The network comprises a plurality of enterprise customers capable of printing to a plurality of color printer types. The method comprises acts of determining a color reference, determining a respective output associated with each of the plurality of color printer types, and comparing the color reference to each respective output; and determining, for each of the plurality of color printer types, a deviation in response to the act of comparing. According to one embodiment of the invention, the method further comprises an act of measuring the respective output of each of the plurality of color printer types. According to another embodiment of the invention, the act of determining a color reference includes an act of determining a color space that represents a potential output of each of the plurality of color printer types. According to another embodiment of the invention, the method further comprises an act of determining a correction based on the determined deviation. According to another embodiment of the invention, the plurality of color printer types are located among a plurality of print service providers distributed in a global network, and wherein the act of determining a color reference includes an act of determining a global color reference.

According to one embodiment of the invention, the method further comprises an act of using the global color reference in a global printing network comprising the plurality of print service providers. According to another embodiment of the invention, the method further comprises an act of displaying information regarding the deviation on a display of a computer system. According to another embodiment of the invention, the method further comprises an act of displaying the information regarding the deviation to a user. According to another embodiment of the invention, the method further comprises an act of determining, based on the determined deviation, whether a print service provider is printing a product in accordance with a service level agreement. According to another embodiment of the invention, the method further comprises an act of determining a specific color reference for a particular color printer and comparing the specific color reference for the particular color printer with a desired output of a print job.

According to one embodiment of the invention, the method further comprises an act of comparing the specific color reference with the desired color output as referenced in a file associated with the print job. According to another embodiment of the invention, the method further comprises modifying the file associated with the print job in response to the act of comparing. According to another embodiment of the invention, the file associated with the print file is a JDF-formatted file, and the act of modifying the file includes modifying the JDF file for the particular color printer.

According to one aspect of the present invention, a method for printing in a distributed communications network is provided. The network comprises a plurality of enterprise customers that are capable of submitting at least one print job to a global network. The method comprises acts of receiving the print job form at least one of the plurality of enterprise customers, allocating at least one first portion of the print job to a first service provider; allocating at least one second portion of the print job to a second print service provider. According to one embodiment of the invention, the acts of allocating are performed transparently to the at least one of the plurality of enterprise customers. According to one embodiment of the invention, the act of allocating the at least one first portion of the print job is in response to pricing information provided by the first service provider. According to one embodiment of the invention, the act of allocating the at least one first portion of the print job is in response to an act of determining a shipping zone associated with the at least one first portion of the print job. According to one embodiment of the invention, the act of allocating the at least one first portion of the print job is in response to an act of determining an availability of the first service provider to produce the at least one first portion of the print job.

According to one embodiment of the invention, the act of allocating the at least one first portion of the print job is in response to an act of determining a relative location of the first service provider to a destination of the at least one first portion of the print job. According to one embodiment of the invention, the act of allocating the at least one first portion of the print job is in response to an act of determining a shipping time for shipping the at least one first portion of the print job to a destination.

According to one aspect of the present invention, a system for printing in a distributed communications network is provided. The system comprises a distributed print management system including a plurality of computer systems, at least one of which is located at a print service provider location, wherein the at least one computer system is adapted to perform acts of receiving a plurality of jobs through the distributed communications network from a plurality of enterprise customers, manage a local print process performed by the print service provider, and provide status information to at least one enterprise customer. According to one embodiment of the invention, the distributed print management system is adapted to receive at least one print job from a web-to-print provider. According to one embodiment of the invention, the distributed print management system is adapted to perform quality monitoring of an output produced by the print service provider. According to one embodiment of the invention, the distributed print management system is adapted to evaluate a service level agreement with the print service provider. According to one embodiment of the invention, the at least one job is submitted using an Internet-based customer center. According to one embodiment of the invention, the at least one print job is fulfilled by more than one print service provider.

According to one aspect of the present invention, a system for printing in a distributed communications network connecting enterprise customers of a graphic service firm and a plurality of print service providers is provided. The system comprises a financial component configured to charge a graphic service firm a service fee based on at least one global print job which is referred to at least one of the plurality of print service providers. According to one embodiment of the invention, the financial component is configured to charge a service fee to the at least one of the plurality of print service providers for the referral of the at least one global print job. According to another embodiment of the invention, the financial component is adapted to receive payment for the at least one global print job through one or more financial institutions. According to another embodiment of the invention, the financial component is adapted to provide payment to the at least one of the plurality of print service providers upon completion of the at least one global print job. According to another embodiment of the invention, the system further comprises a pricing component adapted to minimize a production price of the at least one global print job.

According to one embodiment of the present invention, the pricing component is responsive to prices provided by the plurality of print service providers. According to another embodiment of the invention, the provided prices include pricing associated with attributes of a printed product. According to one embodiment of the invention, the pricing component is responsive to shipping prices provided by at least one shipping provider. According to another embodiment of the invention, the system further comprises a management component adapted to monitor a quality of color output from at least one printer of the print service provider. According to another embodiment of the invention, the management component maintains a color reference to which outputs of a plurality of color printer types in the distributed communications network are compared.

Further features and advantages of the present invention as well as the structure and operation of various embodiments of the present invention are described in detail below with reference to the accompanying drawings. In the drawings, like reference numerals indicate like or functionally similar elements.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
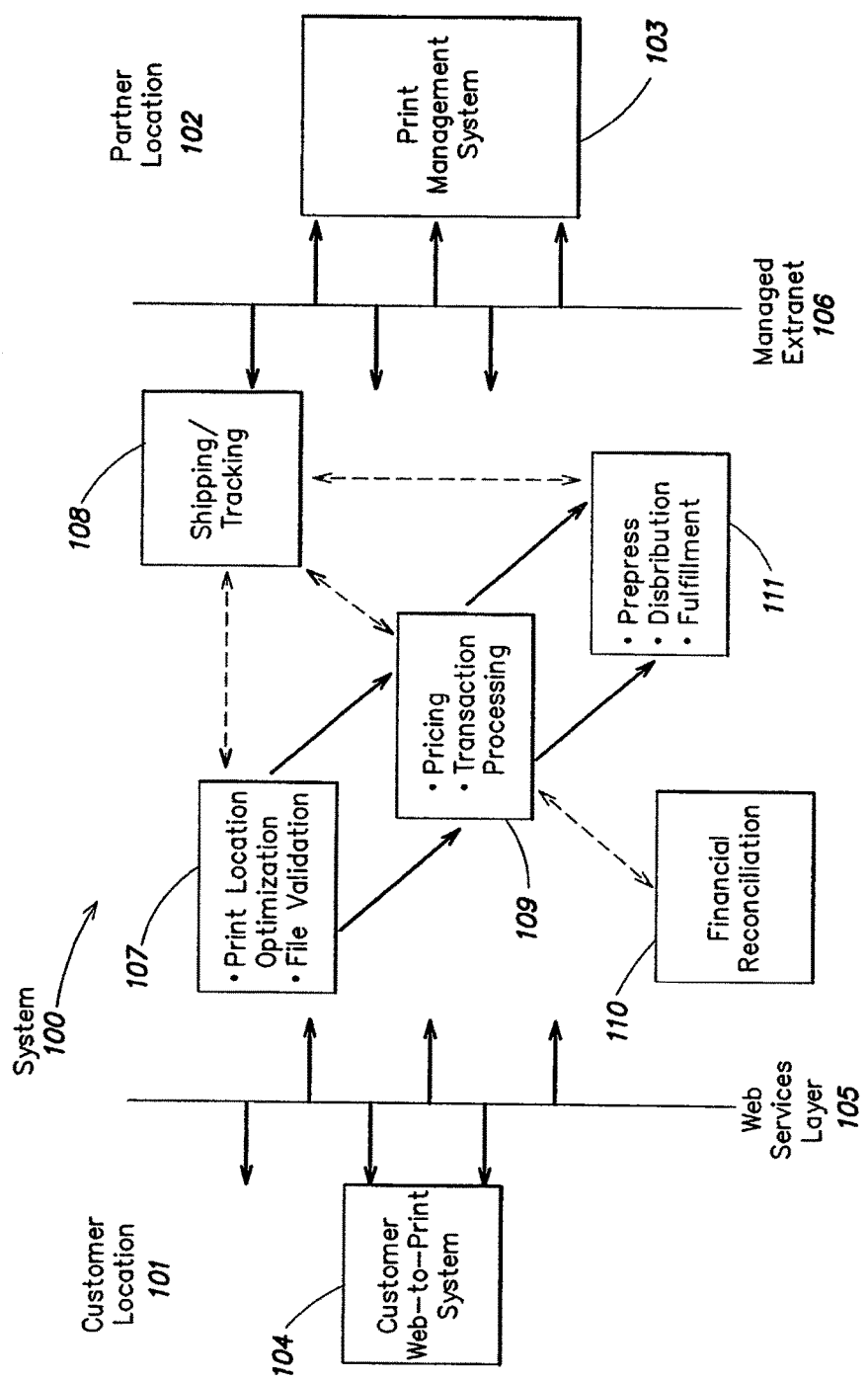
FIG. 1 is a block diagram of a system for printing in a global communication network according to one embodiment of the present invention.

The following examples illustrate certain aspects of the present invention. It should be appreciated that although these examples are provided to illustrate certain aspects of the present invention, the invention is not limited to the examples shown. Further, it should be appreciated that one or more aspects may be implemented independent from any other aspect. This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Various aspects of the present invention relate to a global print platform that provides Print-on-Demand (POD) services to customers. One aspect relates to an architecture that interfaces customers, communication service firms (CSFs) (e.g., graphic service firms (GSFs)), and downstream digital print service providers (PSPs) in a global communications network. Such an architecture permits last-mile production functions that allow the distribution of print jobs to be optimized, containing costs, maintaining quality, and performing billing functions that improve the quality of such networks and make a global print network feasible. As a result, Enterprise customers benefit from lower costs and global sourcing while print service providers and graphics service firms benefit from increased revenue due to increased utilization of the overall global network.

FIG. 1 shows one example system 100 for printing in a global communication network according to one embodiment of the present invention. At a customer location 101, a user (e.g., an Enterprise customer) submits a print job to printing system 100 via a computer system interface. In one specific form, this interface may be an Internet-based interface that permits a user to access, submit, monitor and track print jobs. However, it should be appreciated that any type of network may be used, and the invention is not limited to the specific use of the Internet or an Internet-based interface.

In one embodiment, the user submits a print job to system 100 via a customer web-to-print system 104, which may be, for example, a general-purpose computer system executing a computer program that performs functions relating to performing a global printing process as more fully discussed below. As discussed, the user submits one or more job to system 100, which then manages the production of print products by one or more PSPs. In one example, web-to-print system 104 communicates with other components of system 100 via web services layer 105 as known in the art. It should be appreciated, however, that other communication architectures and protocols may be used.

System 100 may perform one or more functions relating to the management of global printing, such as allocation, production, quality management and billing functions. In one example system, system 100 may include a number of components that interact to perform distributed printing functions, For example, component 107 may perform functions related to optimization of print locations (e.g., based on one or more factors such as shipping costs, availability of printing resources, etc.) and validation of files associated with a print job. When a print job is submitted and validated, pricing may be determined and any transactions may be processed. As discussed above, system 100 may use more than one last mile providers to fulfill a particular print job, so multiple financial transactions may need to be performed for any particular print job. System 100 may also include a component 110 that handles reconciliation of one or more of these transactions.

Further, system 100 may include a component 111 that performs prepress functions such as creating and setting plates for press, and manages distribution of the print product and fulfillment of job orders. Further, one or more components of system 100 may interact with a shipping/tracking component 108 which may handle shipping/tracking functions such as pricing of shipment orders, performing shipping transactions, and managing the shipment process.

According to one aspect of the present invention, a print management system 103 is provided that performs print management functions at a last mile provider, such as a PSP. In one embodiment, system 103 is installed at a partner location 102, and communicates with other components of system 100 over a communication network such as the Internet. Print management system 103, in one embodiment, communicates with other system 100 using a managed extranet 106 accessible through a network of the PSP as known in the art, but it should be appreciated that other communication architectures and protocols may be used.

Currently, print service providers can now deliver print-on-demand (POD) services to their Enterprise customers through the use of print solution software such as the well-known PrintOne Customer Center available from Printable Technologies. This service is enhanced by digital presses such as the well-known Indigo digital press available from the Hewlett-Packard Corporation, which offers high quality 4-color printing with the benefits of fully automated digital control. According to one aspect of the present invention, Enterprise customers that use such POD services are provided the ability to print their virtual inventory globally—to both lower costs and reduce ship times. According to one aspect of the present invention, a global B2B network is provided that matches global printers with global customers and their print jobs. Thus, Enterprise customers using software such as that provided by Printable Technologies can direct print jobs to worldwide locations for true print-on-demand.

Figure 2:
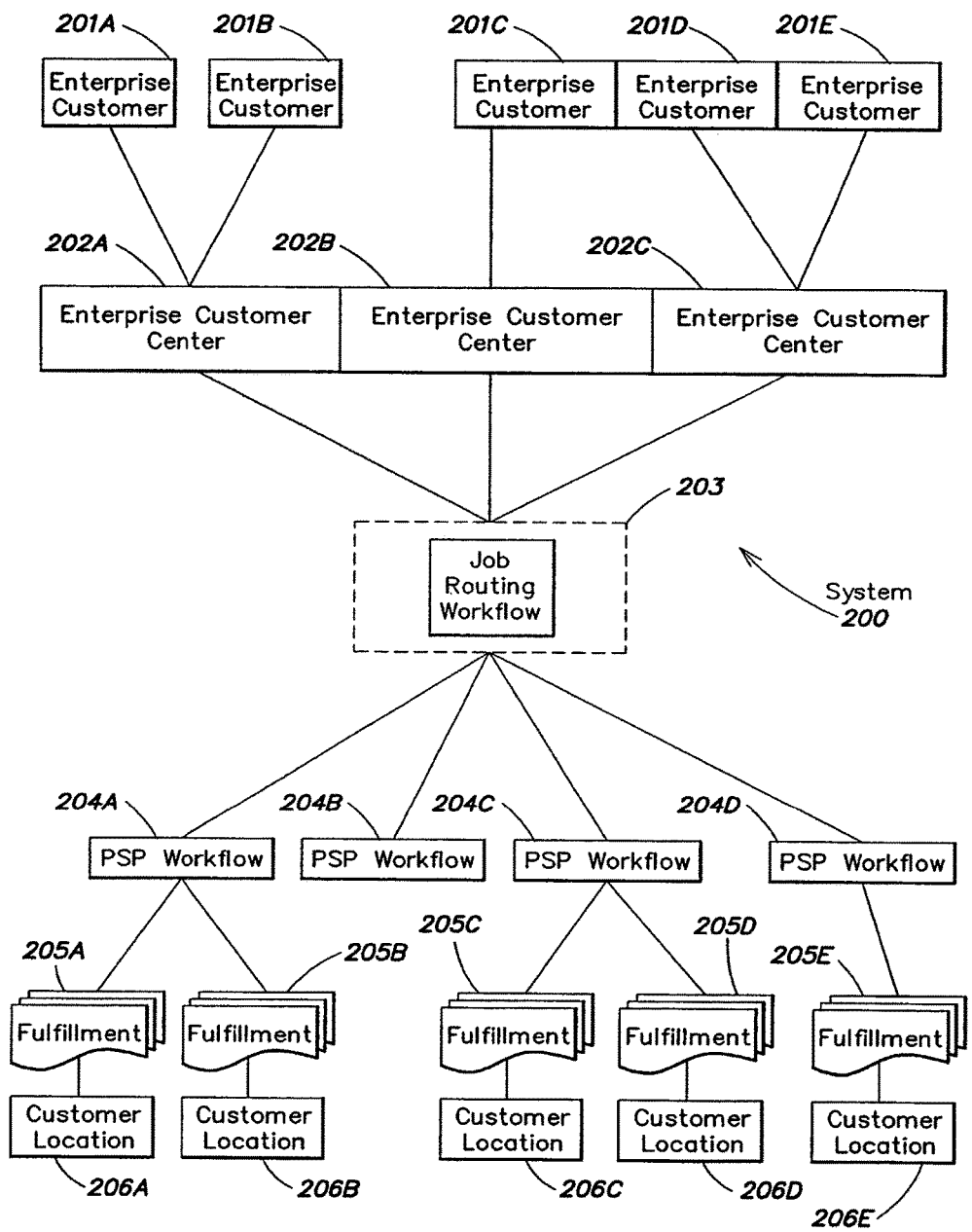
FIG. 2 is a functional block diagram of a distributed printing system according to one embodiment of the present invention.

FIG. 2 shows a functional block diagram of a distributed printing system according to one embodiment of the present invention. In particular, one aspect of the present invention as shown in FIG. 2 includes a system 200 that permits a single customer job to be routed and services by multiple printers, sometimes located in a number of different customer locations. In a conventional single-printer environment, print documents are routed from a requestor system (such as the PrintOne Customer Center available from Printable Technologies) directly to the printer's workflow software for processing. This process is straightforward, but the process limits document sourcing and printing to a single location. By increasing the number of printers available to an Enterprise customer, production and geographic presence is expanded, but setup for each new printer takes time. The next stage, and one goal of this system, is to enable print-on-demand (POD) requests from multiple companies that can be printed by multiple print service providers (PSPs).

As shown in FIG. 2, a global print system 200 includes one or more Enterprise customers 201A-201E (collectively, 201) that create one or more jobs to be fulfilled by the global print system 100. These jobs may be created at one or more Enterprise customer centers 202A-202C through which jobs may be submitted. An example of such a customer center includes the PrintOne Customer Center available from Printable Technologies, but it should be appreciated that other customer center software may be used. System 200 includes a system 203 which performs job routing workflow functions that determine how print jobs will be processed within the global network. System 203 allocates the one or more jobs (or portions of jobs) to one or more PSPs to be produced. The PSP perform PSP workflow functions 204A-204D on the print jobs where the various jobs are produced. Further, fulfillment functions 205A-205E related to the jobs (e.g., billing and associated transactions) may be performed.

To understand the various entities that may be involved in a global print system, the following is a description of organizational types that may interact with a global print system according to various aspects of the present invention. Interfaces to the global print system may be, for example, program interfaces (e.g., an automated system-to-system connection such as a banking module), or the interface may be a manual interaction with an interface (e.g., a dashboard interface displayed to the user through a display of a computer system) by a user. Additionally, some organizations can operate in more than one capacity. For example, a print service provider (PSP) can also be a communication service firm (CSF) (e.g., a graphics service firm (GSF)) and perform its associated functions.

Enterprise Customers—Individuals, companies & organizations seeking to have materials printed.
    Workflow or Document System Software ASPs—Companies like Printable Technologies that offer customers with workflow, virtual inventories, and POD capability.
    Graphics Services Firms (GSFs)—An entity that establishes print relationships with customers and maintains the print material libraries.
    Print Service Provider (PSP)—Companies and organizations that operate one or more digital presses. As discussed, PSPs may also be GSFs.
    Financial entities—Banks and other financial institutions involved with financial aspects of the system.
    Shipping providers—Companies such as DHL, UPS, and FEDEX that ship products to end locations.

Further, the global print system may interact with numerous third party systems. For example, components of the global print system may collect print job orders from customers, forward print jobs to PSPs, and manage financial flows. The following are several possible third parties that may interact with the global print platform:

- Portal Host Customer Center Workflow System (PHCC)—A unified system solution offered by GSFs to their customers to organize and simplify the customer's printing needs. A popular example includes the well-known Printable Technologies Web-to-Print and VDP solutions. Provided by a portal host to their customers, the software provides the Enterprise customer an integrated, real-time system for ordering and managing their printing workflow. A requirement of such a system includes the system being designed to use industry standard JDF-enabled job ticketing.
- PSP Workflow—Workflow software used by digital printers such as the HP Indigo printer (e.g., the well-known ProductionFlow software). One requirement is that the ProductionFlow software uses use industry-standard JDF-enabled job ticketing.
- Financial/Billing—Systems setup to automate financial credits and debits.
- Shipping Services—Companies like DHL and UPS. Interaction with these systems may be performed, for example, through Web service connections.

Figure 3:
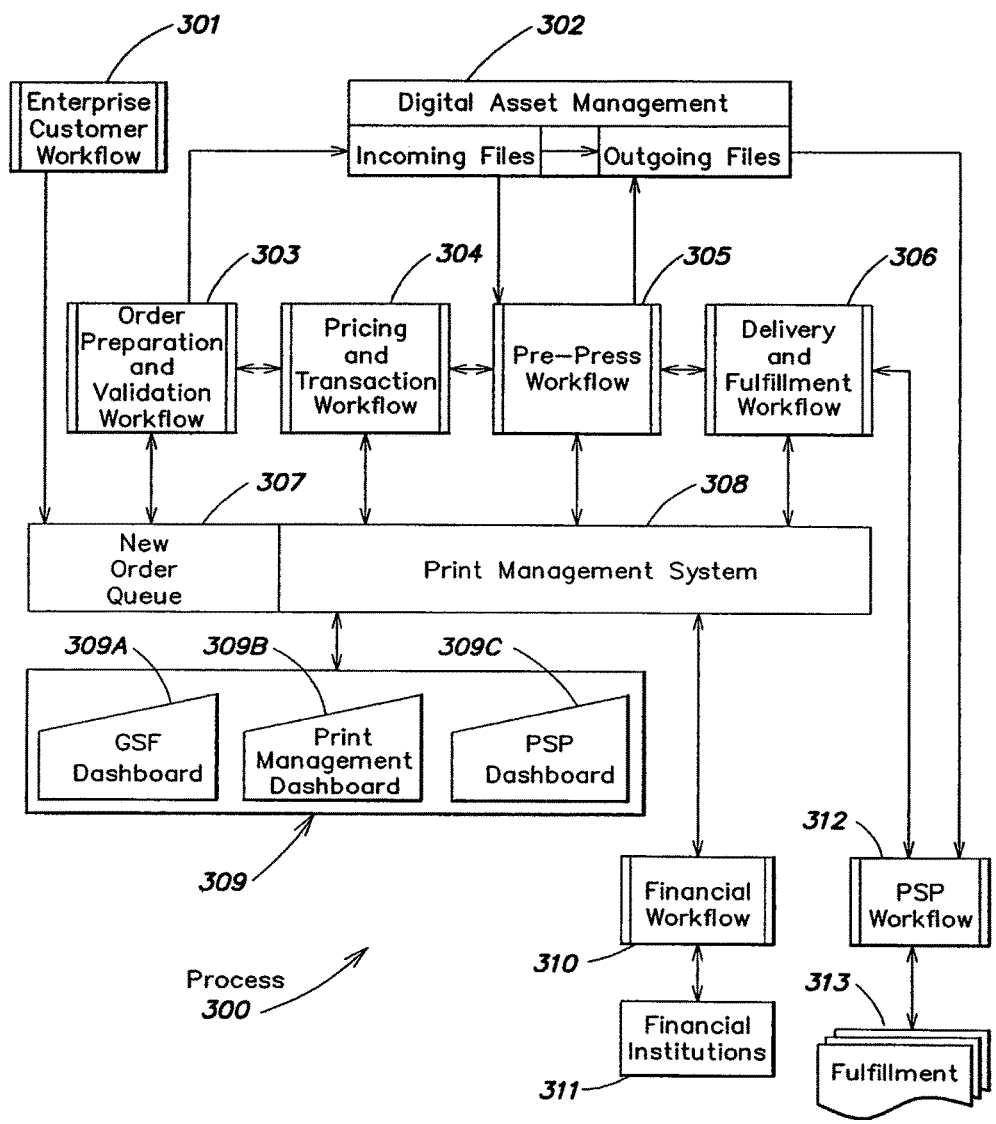
FIG. 3 is a process showing a workflow for printing in a distributed network according to one embodiment of the present invention.

FIG. 3 shows a process showing a workflow for printing in a distributed network according to one embodiment of the present invention. At block 301, process 300 begins. At block 301, an Enterprise customer workflow is performed, which includes receiving a new job to be processed by the global print service (e.g., system 100). At block 307, the job is placed in a new order queue. At block 303, order preparation and validation workflow is performed including validating files associated with the job and preparing any files to be processed. At block 302, digital asset management is performed, including preparing any incoming files and delivering any outgoing files to the PSP workflow of an individual PSP. Once an order is prepared, a pricing and transaction workflow is performed, which includes performing functions regarding determining pricing and performing transactions associated with the job.

At block 305, a pre-press work flow is performed which includes functions associated with pre-press activities as described more fully below. At block 306, there is a workflow associated with delivery and order fulfillment which determine how PSPs will deliver product and be paid for production of print products. At block 312, a PSP workflow is performed which includes producing the actual product and shipping the product to its final destination. At block 313, the product may be sent to multiple destinations and the PSP may be compensated for production of the product.

At block 310, process 300 may include a financial workflow 310 that determines how various entities are paid within the print management system as well as how monies are collected from various enterprise customers. One or more actions may be performed with one or more financial institutions 311 such as banks, credit card companies, or other institutions.

According to one embodiment, the global print management system (e.g., system 100) may include one or more user interfaces for interacting with the global print management system. For instance, the system may include an interface 309 which includes one or more controls associated with various functions of the print management system. In one embodiment, interface 309 includes a GSF-dashboard 309A which performs functions associated with a GSF. For instance, there may be one or more controls or indicators that relate to functions performed by a GSF, including but not limited to maintaining print material libraries and functions relating to interfaces with customers.

Further, interface 309 may include a print management dashboard 309B which indicates the status of a particular print job within the global printing system. Interface 309 may also include a PSP dashboard 309C which indicates information specific to the PSP such as availability, status and other indications.

Several specific examples of the above workflows are discussed in more detail below. It should be appreciated that other workflows may be performed including more or less steps, and it should be appreciated that these are merely examples for illustration purposes only.

Example GSF Workflow

Overview

In one embodiment, the GSF workflow is a process used by a GSF to estimate pricing provided to their Enterprise customers (ECs).

Workflow Steps

1. EC requests new product and pricing from GSF
2. GSF calculates pricing
   a. GSF uses HC price wizard to estimate regional wholesale pricing for
      i. Specified product type based on formula elements
      ii. Requested quantity breaks
   b. GSF develops regional wholesale prices per quantity break for all regions (regional pricing is tagged with the appropriate regional code negotiated with Printable Technologies) and delivers this data in a downloadable spreadsheet (e.g., a Microsoft Excel file) to the GSF
   c. GSF adjusts the spreadsheet by adding a retail margin to wholesale prices
   d. GSF uploads the spreadsheet file into the Printable Technologies system
   e. Printable Technologies system inputs and stores pricing for the item
3. GSF Pricing The GSF defines regional prices (for example, there could be 25 regions in the global print system) for customer requested products that are printed by the global distributed printing system. GSF creates the retail price using the downloaded pricing spreadsheet.

Wholesale Price Wizard

According to one embodiment, available within a GSF dashboard (e.g., dashboard 309A), the wholesale price wizard may function as a tool for GSFs to estimate the wholesale price for a GSF product. The GSF may use the provided wholesale prices to calculate a retail price to be presented to the EC.

Inputs:

1. Paper attributes (e.g., as displayed in a pre-selected drop down list that provides groups of global paper types that meet requirements)
2. Quantity of finished units
3. Colors per side
4. Folds
5. Cuts
6. Stitches
7. Bleed (yes/no)
8. Quantity break
   a. Start
   b. End
   c. Break (more than one break can be added in future iterations of the dashboard)

Outputs:
1. GSF wholesale price
   a. Calculated for all quantities listed in break
   b. By regional zones
2. Web report
   a. For on-screen review or printout
3. Excel file
   a. In a Printable spreadsheet file format for download Shipping Estimate Web Service A web service called by the Printable Technologies ECC, and other types of ECCs to obtain a retail shipping allocation.

Inputs:
1. Product attributes
   a. Paper type (sufficient to determine weight)
   b. Quantity
   c. Finish size
2. "Ship to" address Output
1. Shipping Estimate Enterprise Customer Workflow Overview The process whereby enterprise customers order printed materials from their graphic service firm. To order printed materials, ECs access an ECC portal setup by their GSF to manage the ECs print needs. In one embodiment of the global print system, the Printable Customer Center supported as an interface through which print jobs may be created, however, it should be appreciated that other Enterprise Customer Center types may be supported.

Customer Workflow

Working within the ECC Portal (Printable) system

Enterprise Customer:
1. Selects product
2. Adds Quantity
3. Printable Technologies system displays to EC Retail pricing (global print service pricing plus GSF markup)
4. Printable (ECC) system calculates shipping based on default "ship to" location.
   a. Shipping estimate obtained from global distributed printing system service, based on default "ship to" location and product attributes.
5. Customer selects purchase, goes to check out
6. If customer desires, changes "ship to" location for specific items in shopping cart (on a global or per item basis)
7. Printable (ECC) system calculates shipping and new regional pricing if ship to address is in a new zone:
   a. Zone calculation is determined by interaction with the global distributed printing system service based on the 'ship to' location
   b. Shipping estimate obtained from global distributed printing system service, based on 'ship to" location and product attributes and zonal calculations.
   c. Zone pricing is obtained from a Printable service, based on the zone location requested from the global distributed printing system and previously stored GSF pricing with quantity breaks.
8. Customer reviews pricing changes and orders product
9. Printable (ECC) system sends order to the global distributed printing system service.

New Order Web Service

Web service used by Printable Technologies, and other ECCs, to send new orders to the global distributed printing system.

Inputs
1. Order Identification
   a. Printable ID
   b. GSF ID
2. URL of print job files
   a. JDF
   b. Low-res files
   c. Hi-res files
3. Order Details
   a. Order details not already contained in the JDF.

Printable (ECC) System Requirements

Printable and other types of ECC systems may need the ability to use the following global distributed printing system web services.
1. Zone calculation
2. Shipping allocation web service
3. New order web service Order Preparation Workflow Overview Once a new order has arrived, the preparation workflow prepares the system so it can process the new order. This includes the internal organization functions along with obtaining the print documents from the ECC site.

Workflow Steps
1. Obtain next order in queue via order Web service
   a. URL of documents
   b. GSF identity
   c. Update database and log activity
2. Register new order
   a. Create new order 1D
   b. Create folders for order print documents in DAM
   c. Update database and log activity
3. Download documents from URL
   a. Download JDF
   b. Download supporting print documents
   c. Store in DAM folder
   d. Update database and log activity
4. Issue notifications Requirements Asynchronous Workflow To expedite job processing, the preparation steps may be managed in an asynchronous fashion. This allows, for example, the JDF to begin the validation process while the hi-res documents are still being downloaded.

New Order Module

Procedure that prepares the system for new orders. Steps may include, for example, creating new order IDs, and creating new folders within the DAM for incoming and outgoing print files.

Download Module

Procedure that downloads job files from the ECC URL and stores them in the local DAM.

Notifications Module

As identified, issues e-mail and dashboard notifications.

Verification Workflow

Overview

A first step in the order process is to validate the order details. The system may locate the information necessary to process the order, validate the order, and store the order in the database for use by subsequent workflows.

Workflow Steps
1. Technical check
   a. JDF in valid form
   b. JDF information complete
   c. Supporting documents available
      i. Print documents listed in JDF
   d. Update database and log activity 2. Business Logic Check
a. Is the order information complete
b. Is the GSF on "credit hold"
   i. If yes, suspend job
3. Update database and log activity
4. Issue notifications Requirements Verify New Order Module A procedure that locates and verifies order information received by the New Order web service. Information may be recorded in the database for future workflow use.

JDF Format Valid Module

Procedure that verifies that the order JDF is in proper XML format, and that the JDF version is consistent and complete. This step may be performed prior to reading the JDF order information.

1. XML validation using system utility
2. JDF validation
a. Version is consistent across all JDF flies
b. Supporting JDF documents exist
   i. JDFCapability.xsd
   ii. JDFCore.xsd
   iii. JDFMessage.xsd
   iv. JDFProcess.xsd
   v. JDFResource.xsd
   vi. JDFTypes.xsd JDF information valid and complete module Procedure locates and records all the order details located in the JDF. Data attributes are located, its existence verified, and the data stored in the database for future workflow processing.

To ensure and control orders submitted to the global distributed printing system fall within the prescribed contractual guidelines, this section also validates that the print job parameters are valid against a listing of approved parameters.

Attributes to be Verified and/or Validated:

1. Paper attributes
a. flat size
   i. A3
b. finish size
   i. only for existence
c. paper type
   i. in list
d. weight
   i. 150 gsm, 220 gsm, 270 gsm
e. coat & sheen
   i. coated 1 side, gloss
   ii. coated 2 sides, gloss
   iii. coated 2 sides, dull
   iv. uncoated
2. Print process attributes
a. Color per side
b. quantity
3. Finish attributes
a. Folds
b. Cuts
c. Stitches
d. Bleed
4. Ship to address To be identified:
Other order details to be verified & acceptable values
Exact location in the JDF for each element Pricing and Transaction Workflow Overview With the order validated, this section manages the financial and administrative functions. Pricing is calculated, the PSP is selected, and GSF and PSP margins are determined for the job.

Workflow Steps

1. Zone Identification
a. Determine distributed printing system zone based on shipping location
2. Wholesale price calculation
a. distributed printing system wholesale price
b. GSF price (wholesale price plus a global print management transaction fee)
c. PSP price (wholesale price less a global print management transaction fee)
3. PSP assignment
4. Shipping Allocation calculation
5. Order Accepted
a. Charge GSF for Order
b. Initiate Financial GSF-Charge To workflow
c. Record PSP payment, pending fulfillment Requirements Region Identification Using the "ship to" location, determines and records which region should process the order.

1. Input
a. "ship to" address
2. Output
a. distributed printing system zone
3. Selection Logic
a. "ship to" country used to determine zone and PSP Pricing and Costing This section calculates the wholesale price, the margin marked up price for the GSF and the initial margin discounted cost for the PSP. Values may be based on the product pricing variables and quantity. Updates database status flags as appropriate, logs activity and initiates necessary notification emails.

Inputs:

1. Zone
2. JDF inputs
a. Paper Attributes
   i. Flat size
   ii. Paper type
   iii. Weight
   iv. Coat and sheen
b. Print Process
   i. Finish size
   ii. Color per side
   iii. Quantity
   iv. Number Up
   v. Number of folds per unit
   vi. Forms stitching
3. Database inputs (based on Region)
a. Stock cost
   i. based on paper inputs
b. Click cost
c. Cut Cost
   i. fixed per job
   ii. variable per cut
d. Fold
   i. fixed per fold
   ii. variable per fold
e. Stitching
   i. fixed per form
   ii. variable per form/unit f. Administration
  i. fixed per order
g. Margins
  i. GSF markup margin
  ii. PSP markdown margin
Output
  1. Wholesale price
  2. GSF marked up price
  3. PSP markdown cost
PSP Allocation Determines which PSP will print the job. According to one example, distribution logic may be based on a 'pro-rated round robin' approach (in most cases, this approach may default to a single location). Updates database status flags as appropriate, logs activity and initiates necessary notification emails.

Inputs
  1. Region
Output
  1. PSP
Shipping

Based on the "ship to" location, web service calculates single shipping allowance. Updates database status flags as appropriate, logs activity.

Open: Exact algorithm to determine total weight, box packaging and number of packages to be shipped (TBD). Packaging logic expected to mimic Printable approach. Shipping cost estimates under consideration include making request to shipping company web service (such as DHL).

Pre-Press Workflow
Overview

This process prepares the JDF for the target PSP printer, and creates the press ready file(s). Once this workflow has completed, the JDF will have been color adjusted to the PSPs reference printer and the press ready file. The updated JDF, along with the press ready file can then be picked up by the PSP.

Workflow Steps
  1. ICC color profile
  a. Insert the ICC color profile reference into JDF based on PSP
    i. ICC color reference—per PSP.
  b. Export update JDF to HC RPP folder for pickup by HC Production
  2. HP ProductionFlow RIPs file
  a. ProductionFlow picks up JDF file
  b. ProductionFlow pulls in pre-print documents from DAM
  c. ProductionFlow creates JLYT file
    i. Uses PSP ICC profile reference
  d. Export JYLT
    i. Stores RIP'ed JYLT in HC DAM
  e. Exports JDF to RPP folder for PSP polling/pickup
    i. Updated JDF
    ii. JDF contains URL of JLYT on global print management system server ICC Color Profile Adjustment Process that compares the individual ICC color profile for the target digital printer with the desired color output defined in the JDF. The JDF is then updated to reflect the target digital printer so that the final product is the color desired by the EC. The system updates database status flags as appropriate, logs activity and initiates any necessary notification emails.

Delivery and Fulfillment Workflow

This section passes the order on to the selected PSP.

Workflow Steps
  1. If PSP has HP ProductionFlow or other JDF compatible ISV system
    a. PSP's workflow polls designated RPP folder
      i. PSP downloads new JDF
    b. PSP's workflow reads JDF
      i. Obtains URL of JYLT
    c. PSP's workflow downloads JYLT
    d. PSP schedules, prints and delivers product
  2. PSP does not have ProductionFlow or other JDF compatible ISV system.
    a. HC notifies PSP of new print job
      i. Includes URL
        01. JDF (if needed)
        02. JYLT
    b. PSP will have to manually download and process the JYLT.

Dashboard Workflow
Overview

According to one embodiment, the dashboard interface serves as the human window into the system. Operational information, job status, intervention issues, as well as standard CRUD (Create, Read, Update and Delete) activities all reside within the dashboard. Use case scenarios may be used to determine the presentation of the dashboard to any given user or group. One goal is to develop a standardized and database driven dashboard framework and security model.

Main Dashboard Areas
  1. Print Management
    a. Sales
      i. New GSF entry and ongoing GSF management
      ii. New PSP entry and ongoing PSP management
      iii. GSF and PSP order volume views (by company, geography, and salesman)
    b. Customer Service
      i. Orders that have exceeded preset conditions (that approach SLA landmarks)
      ii. Contact information links for GSFs or PSPs assigned to the order
      iii. Resolution process notes
    c. Management & Business Tools
      i. SLA compliance management screen (allows sorting based on criteria)
      ii. More TBD
    d. Financial
      i. Order volume by time period
      ii. Revenues by timer period
      iii. TBD by CFO (very configurable)
  2. PSP
    a. General
      i. Company Info
      ii. SLA requirements and tracking
    b. Operations (Network)
      i. General
      ii. Delivery Area
      iii. Equipment
      iv. Pending orders and SLA requirements
    c. Fulfillment (separate log-in)
    d. Business Tools
  3. GSF
    a. General
      i. Company Info
      ii. SLA requirements and tracking b. Sales (separate log-in)
   i. Price estimator
c. Business Tools Skinned The ability to change appearance for different user groups. Includes GSFs, PSPs, ECs and global print system departments and management.

Nested Security Groups

Support for nested groups, with differing security and data access levels. Different departments and staff levels within each group may have varying data modification permissions.

Financial Workflow

Overview

The section outlines any financial-related sections.

GSF—Charge to

Process to automatically charge to, and collect from financial institutions for accepted orders received from GSFs. Transactions are to be done on a per transaction basis. The GSF—charge to workflow may be initiated by the Pricing and Transaction Workflow.

PSP—Pay to

Process to automatically make payment to PSPs through financial institutions for delivered orders. Payment transactions are to be done on a periodic basis. Initially, payment cycle may be weekly. Exact day of the week, and time of day to be determined. Periodic payment cycle to be initiated via BizTalk timed workflow.

Currency

All transactions may be in United States Dollars (US$).

It should be appreciated that the process performed in FIG. 3 may include more or less workflows or processes, and the invention is not limited to any particular workflow or process.

According to one aspect of the present invention, one or more functions of the print management system may be performed by a general purpose computer system as discussed in more detail below. In one embodiment, a print management system is installed at a location of the print service provider, and manages the distributed print process at such a location. In one example system, the print management system is an inexpensive system that enables local print service providers to receive jobs from a global printing network.

General Purpose Computer System

As discussed above, various embodiments according to the present invention may be implemented on one or more computer systems. These computer systems may be, for example, general-purpose computers such as those based on Intel PENTIUM-type processor, Motorola PowerPC, AMD Athlon or Turion, Sun UltraSPARC, Hewlett-Packard PA-RISC processors, or any other type of processor. It should be appreciated that one or more of any type computer system may be used to facilitate an online ecosystem according to various embodiments of the invention. Further, the system may be located on a single computer or may be distributed among a plurality of computers attached by a communications network.

A general-purpose computer system according to one embodiment of the invention is configured to perform any of the described functions, including but not limited to managing print production, quality and delivery. It should be appreciated, however, that the system may perform other functions, including performing financial transactions, receiving payments from customers, providing indications to users observing the status of the global print process, etc., and the invention is not limited to having any particular function or set of functions.

Figure 4:
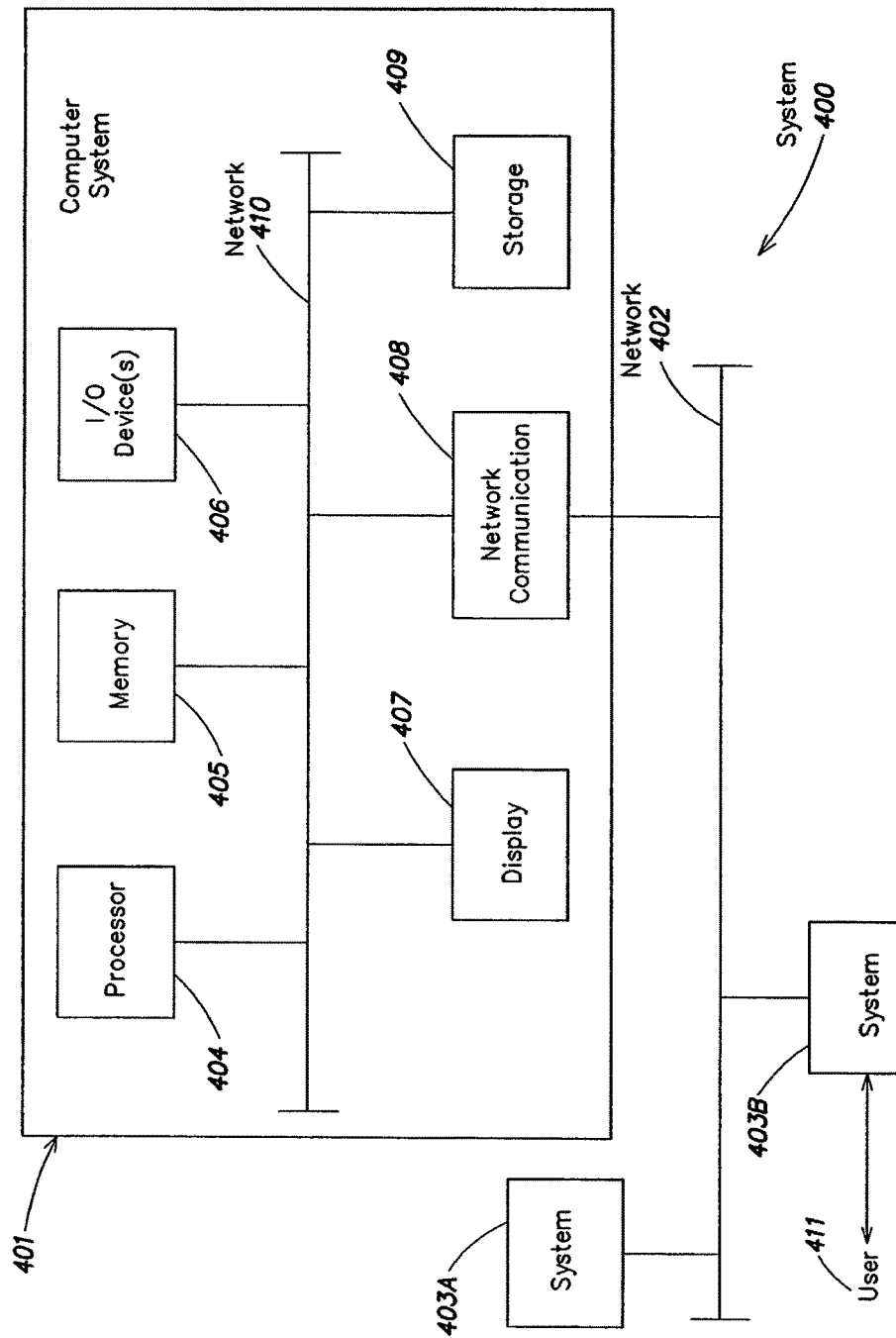
FIG. 4 is general purpose computer system suitable for implementing various aspects of the present invention.

FIG. 4 shows a block diagram of a general purpose computer and network system 400 in which various aspects of the present invention may be practiced. For example, various aspects of the invention may be implemented as specialized software executing in one or more computer systems including general-purpose computer system 401 shown in FIG. 4. Computer system 401 may include a processor 404 connected to one or more memory devices 405, such as a disk drive, memory, or other device for storing data. Memory 405 is typically used for storing programs and data during operation of the computer system 401. Components of computer system 401 may be coupled by an interconnection mechanism such as network 410, which may include one or more busses (e.g., between components that are integrated within a same machine) and/or a network (e.g., between components that reside on separate discrete machines). The interconnection mechanism enables communications (e.g., data, instructions) to be exchanged between system components of system 401.

Computer system 401 may also include one or more input/output (I/O) devices 406, for example, a keyboard, mouse, trackball, microphone, touch screen, a printing device, display screen, speaker, etc. In addition, computer system 401 may contain one or more interfaces (e.g., network communication device 408) that connect computer system 401 to a communication network (in addition or as an alternative to the network 410.

The storage system 409, typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM).

The memory may be located in storage system 409, as shown, or in memory system 405. The processor 404 generally manipulates the data within the memory 405, and then copies the data to the medium associated with storage 409 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 401 is shown by way of example as one type of computer system upon which various aspects of the invention may be practiced, it should be appreciated that aspects of the invention are not limited to being implemented on the computer system as shown in FIG. 4. Various aspects of the invention may be practiced on one or more computers having a different architectures or components that that shown in FIG. 4.

Computer system 401 may be a general-purpose computer system that is programmable using a high-level computer programming language. Computer system 401 may be also implemented using specially programmed, special purpose hardware. In computer system 401, processor 404 is typically a commercially available processor such as the well-known Pentium class processor available from the Intel Corporation. Many other processors are available. Such a processor usually executes an operating system which may be, for example, the Windows-based operating systems (e.g., Windows Vista, Windows NT, Windows 2000 (Windows ME), Windows XP operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this system can be implemented by one or more systems similar to system 400. For instance, the system may be a distributed system (e.g., client server, multi-tier system) comprising multiple general-purpose computer systems. In one example, the system includes software processes executing on a system associated with a user (e.g., a client computer system). These systems may permit the user to submit jobs, view status of a job, make payments, among others. There may be other computer systems, such as those installed at a PSP location that perform functions such as receiving jobs and their associated files at the local PSP site, transferring the job to various print entities such as digital offset printers, monitoring status and quality, among other functions. As discussed, these systems may be distributed among a communication system such as the Internet. One such distributed network, as discussed below with respect to FIG. 5, may be used to implement various aspects of the present invention.

Example System Architecture

Figure 5:
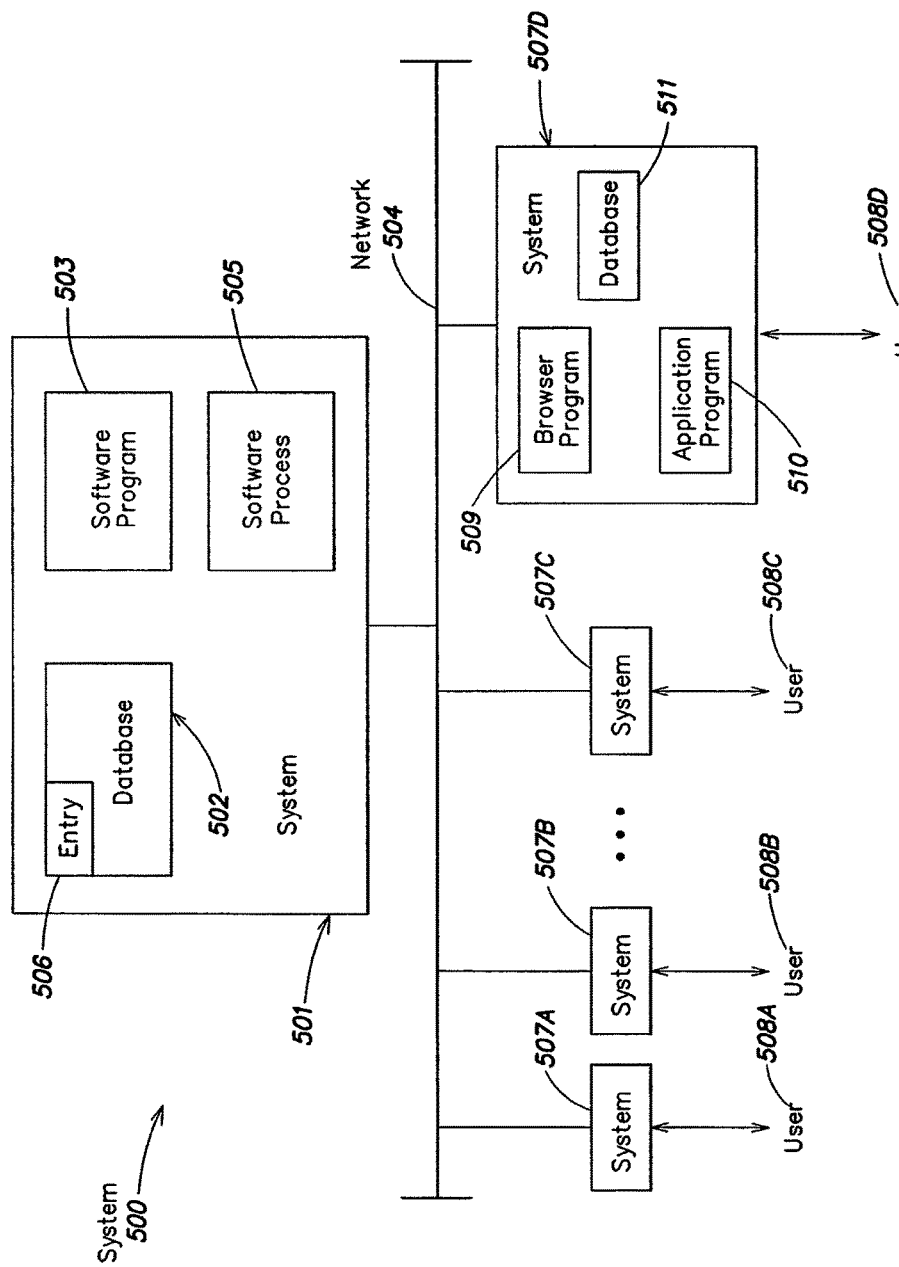
FIG. 5 is a general architecture of a distributed computer system suitable for implementing various aspects of the present invention.

FIG. 5 shows an architecture diagram of an example distributed system 500 suitable for implementing various aspects of the present invention. It should be appreciated that FIG. 5 is used for illustration purposes only, and that other architectures may be used to facilitate one or more aspects of the present invention.

System 500 may include one or more general-purpose computer systems distributed among a network 504 such as, for example, the internet. Such systems may cooperate to perform functions related to the global print process. In an example of one such global print system, one or more users 509A-508D operate one or more client computer systems 507A-507D through which jobs are submitted to the global print system, payments are transacted, and status of the print process may be observed. In one example, customers (users) interface with the global print system via an internet-based interface.

In one example, a system 507D includes a browser program 509 such as the Microsoft Internet Explorer application program through which one or more websites may be accessed. Further, there may be one or more application programs 510 that are executed on system 507D that perform functions associated with the global print system. System 507D may include one or more local databases 511 including, but not limited to, information relating to current jobs being executed for a particular user, billing information, or other information associated with the global print process.

Network 504 may also include, as part of the global print system, one or more server systems 501 that cooperate to perform various functions of the global print system including print process management, print job execution, billing, shipping, and other functions. System 501 may include one or more databases 502 for storing job entries 506 and their associated files and data associated with the job order. System 501 may be a general-purpose computer system capable of executing a software program 503 that, when executed, executes a software process 505 in memory of computer system 501. System 501 may execute any number of software programs or processes and the invention is not limited to any particular type or number of processes. Such processes may perform the various workflows associated with the global print system.

Figure 6:
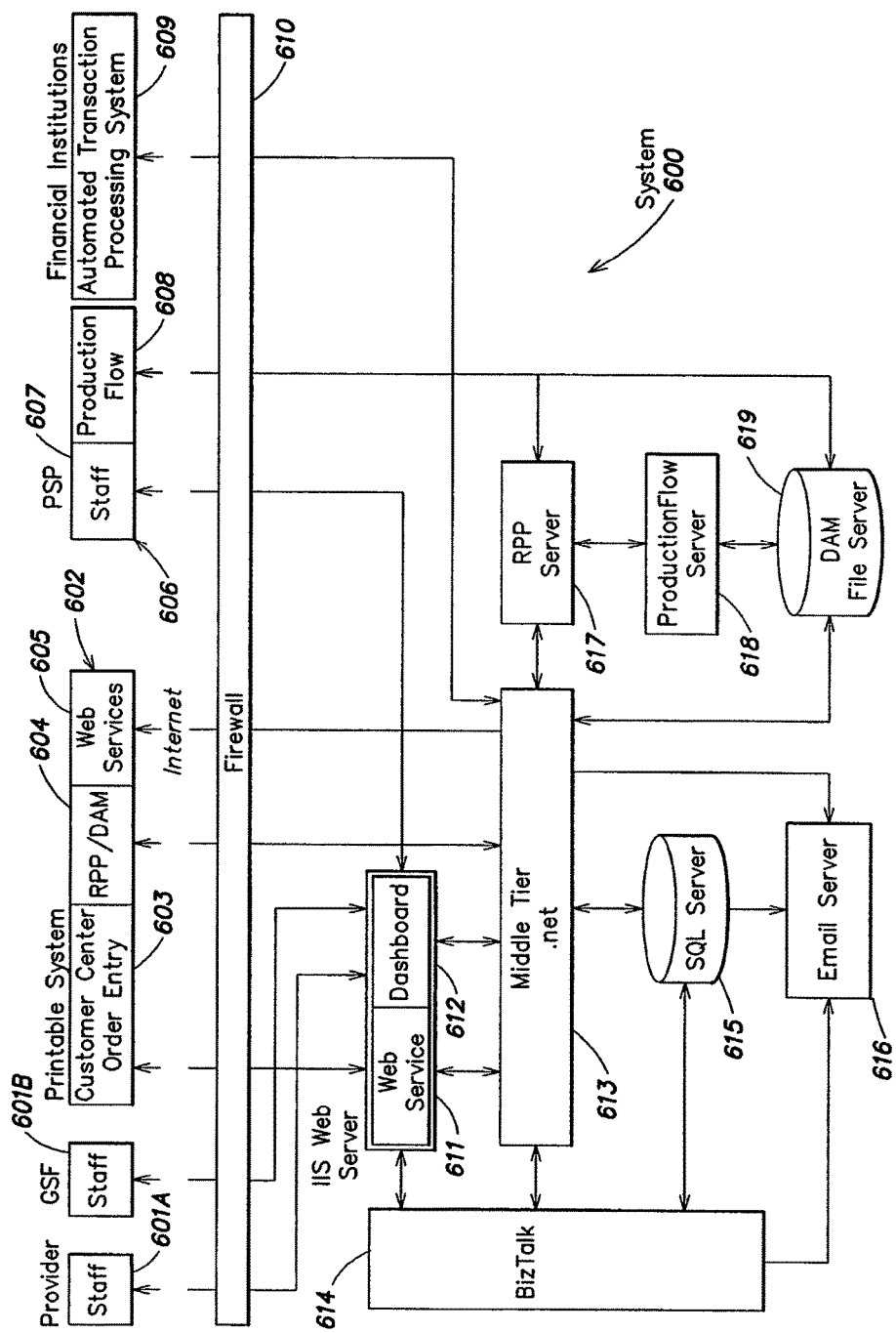
FIG. 6 is an example architecture of a distributed computer system according to one embodiment of the present invention.

FIG. 6 shows a more specific example architecture of a global print system according to one embodiment of the present invention. System 600 may include one or more general-purpose computer systems such as those discussed above with reference to FIG. 4 distributed among a network as discussed above with reference to FIG. 5. For example, in one such architecture as shown in FIG. 6, there may include a number of interfaces to system 600 including user and programmatic interfaces. System 600 may include an Internet Information Service (IIS) web server which includes a web server 611 and dashboard 612 which processes all incoming dashboard and web service requests received from various entities through the internet. The web server interacts with web services, middle tier components 613 and a database (e.g., accessible via SQL server 615) to complete a user request.

System 600 may also include an application server (e.g., BizTalk server 614) to support business process workflows and rule-based processes. According to one embodiment, server 614 manages business workflows including a main ordering process and any supporting workflows. As is known, a BizTalk server acts as a process manager, calling on various web services, middle tier functions and database procedures to perform actual work.

Middle tier server 613 (e.g., dot net server) supports various system objects and their associated functions that perform various functions of the system 600. Example include, pricing functions and shipping allocation. Middle tier objects may be used by web services 611, dashboard 612, BizTalk server 614 and other middle tier objects System 600 may also include an email server 616 that provides various system processes with the ability to send email notifications. System 600 may also include a RPP server 617, a production flow server 618 that supports for example, an HP ProductionFlow system, and a digital asset management (DAM) file server which holds transient print job files for a limited amount of time.

As discussed, system 600 may include one or more interfaces through which users and programs may access the global print management system. One interface provider may include a provider interface 601A through which staff may monitor and control global print process. Further, there may be other interfaces through which other organizations need to monitor and control the global print process. For example, an interface 601B may be provided to the GSF to permit staff to monitor and perform controls associated with system 600.

In one example system as discussed above, a user may order print jobs through a customized center order entry 603 such as one provided by the printable technologies corporation. Such orders may be transferred to the global print system for distribution among a number of printing resources. The printable system 602 includes an RPP/DAM server 604 which interfaces with system 600 and includes web services 605 which also interfaces with system 600.

Further, a PSP 606 may be provided an interface 607 through which staff may monitor and control the print process. PSP 606 may include a production flow component 608 that monitors production of print product among a number of different print resources. In addition, a number of automated transaction processing systems 609 may interface to system 600 for performing payments, receiving payments, and other types of financial processes.

Figure 7A:
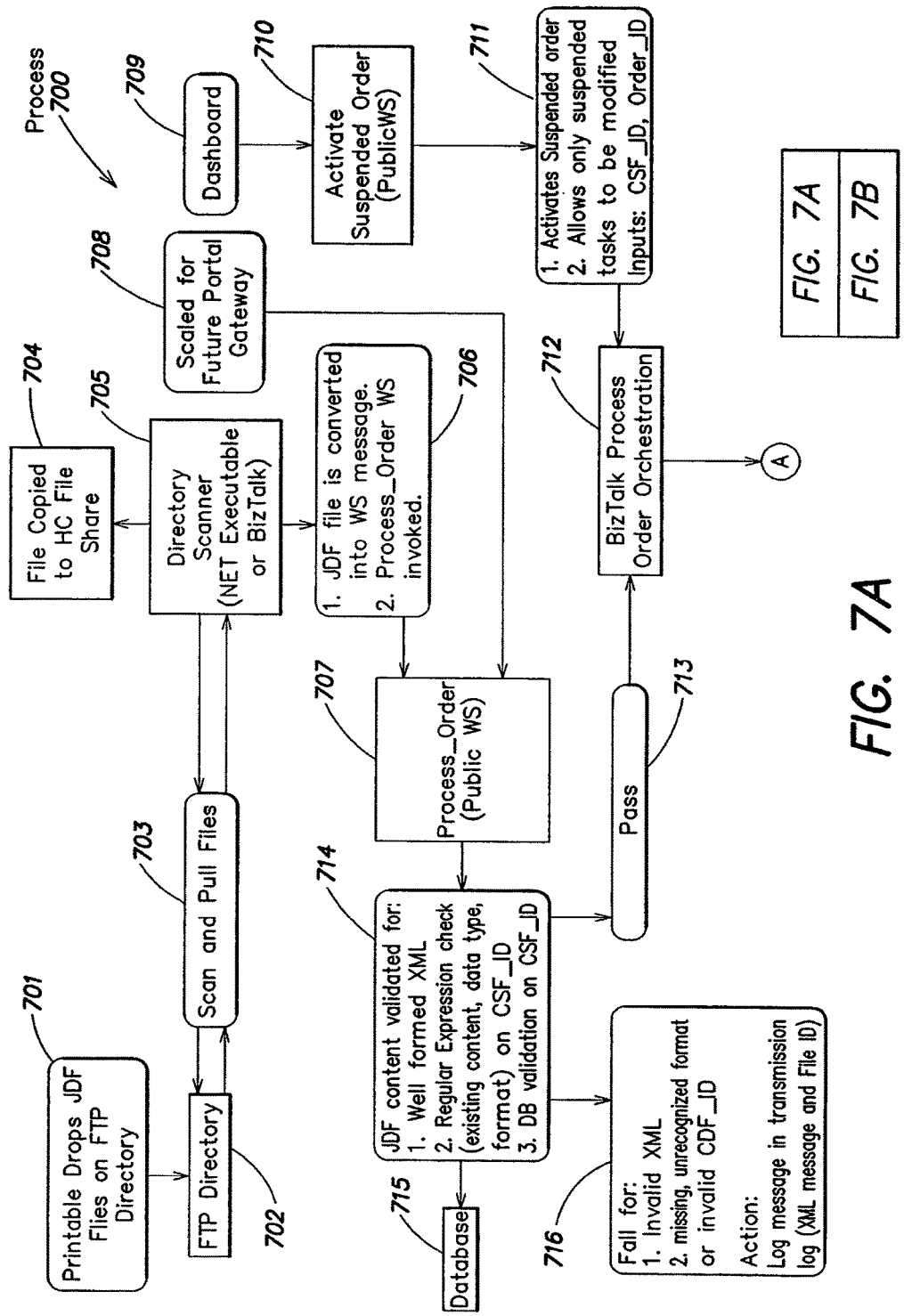
FIGS. 7A and 7B show a process for performing a printing process according to one embodiment of the present invention.
Figure 7B:
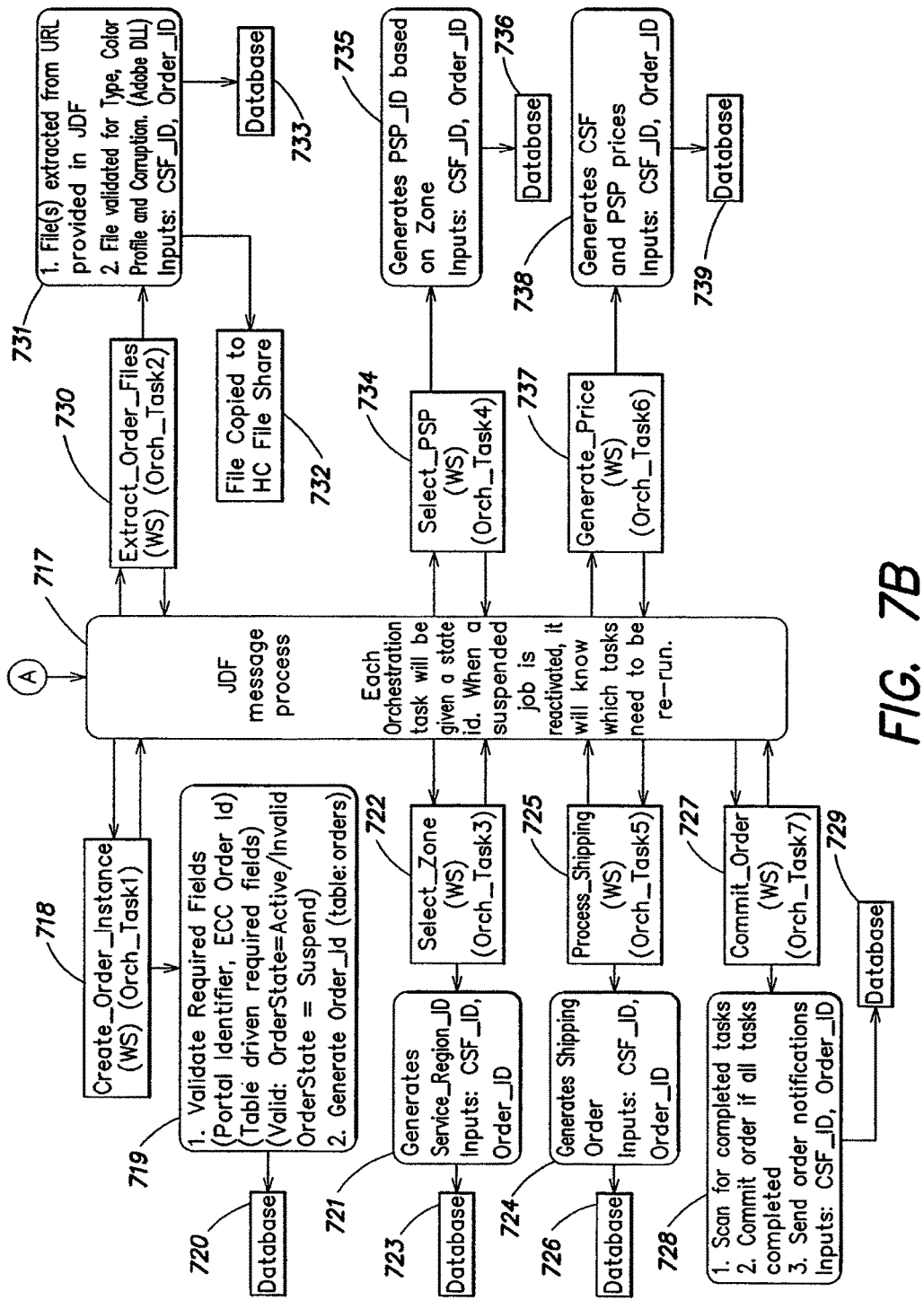

FIGS. 7A and 7B show a process 700 for performing the global print process according to one embodiment of the present invention. For example, process 700 may be implemented using the architecture shown and discussed above with reference to FIG. 6. At block 701, a customer order entry system such as one available from Printable Technologies drops a job to be executed on a global print system. This may be accomplished, for example, by transferring Job Definition Format (JDF) files to an FTP (File Transfer Protocol) directory on the global print server at block 702. Job Definition Format files is a well-known print communication format which is based on XML (Extensible Markup Language) which allows a user to describe a workflow of a particular print job.

At block 703, a server process scans and pulls job files that are placed in at the FTP directory at block 702. At block 705, the system may perform a directory scan of the jobs in its current queue (e.g., such a process may be a .NET executable or a BizTalk process) that processes jobs in the queue as they are created. At block 706 the JDF file may be converted into a message (e.g., a web services message). Further, a process that indicates a live order to be processed (Process Order) may be invoked. At block 714, JDF content may be validated to determine whether the order may be processed. In particular, JDF content may be inspected for whether the XML information is well-formed, regular expressions are checked, and database validation. If the JDF is validated, the JDF files may be stored in a database 715. If not, the validation process fails and a message may be generated to the submitting user. For instance, the JDF content may fail for invalid XML, missing or unrecognized formats, or an invalid database ID. In response, a message may be generated within a transmission log.

If however, the JDF content passes the validation check at block 713, business process rules (e.g., BizTalk process) may begin processing the submitted order. Further, dashboard controls may allow a user operating a dashboard 709 to control one or more processes with a submitted order, such as, for example, activating a suspended order at block 710. For instance, at block 711, the system activates a suspended order and allows suspended tasks to be modified, if necessary.

At block 717, a JDF message process is performed. According to one embodiment, each orchestration task is provided a state identifier. When a suspended job is reactivated, the system may be able to identify which tasks need to be re-run.

There may be a number of workflow processes which are executed upon receipt of a valid JDF file. At block 718, an order instance is created which tracks the JDF file as it progresses through the system. At block 719, fields are validated (e.g., a portal identifier, an order ID, etc.) and an order identifier is generated. At various steps within various workflows, data may be persisted to the database (e.g., at blocks 720, 723, 726, 729, 733, 736, and 739).

For each portion of the job to be produced, a shipping zone is selected at block 722 to which the product is to be produced. At block 721, a service region identifier is generated based on the order identification. At block 725, a shipping order is processed and is generated at block 724 based on the order identifier. At block 727, the order is committed if all tasks associated with the order are completed.

At block 730, files associated with the order are extracted and more specifically at block 731, any files are extracted from a URL indicated within the JDF file. Extracted files are validated for type, color, profile, and corruption. Files are then copied to a file shares at block 732 for processing by particular PSP. At block 734, a particular PSP is selected for producing the job order. At block 735, the system generates a PSP identifier based on the zone to which the job needs to be shipped. At block 737, the system generates pricing information, including, at block 738 CSF and PSP pricing information.

Figure 8:
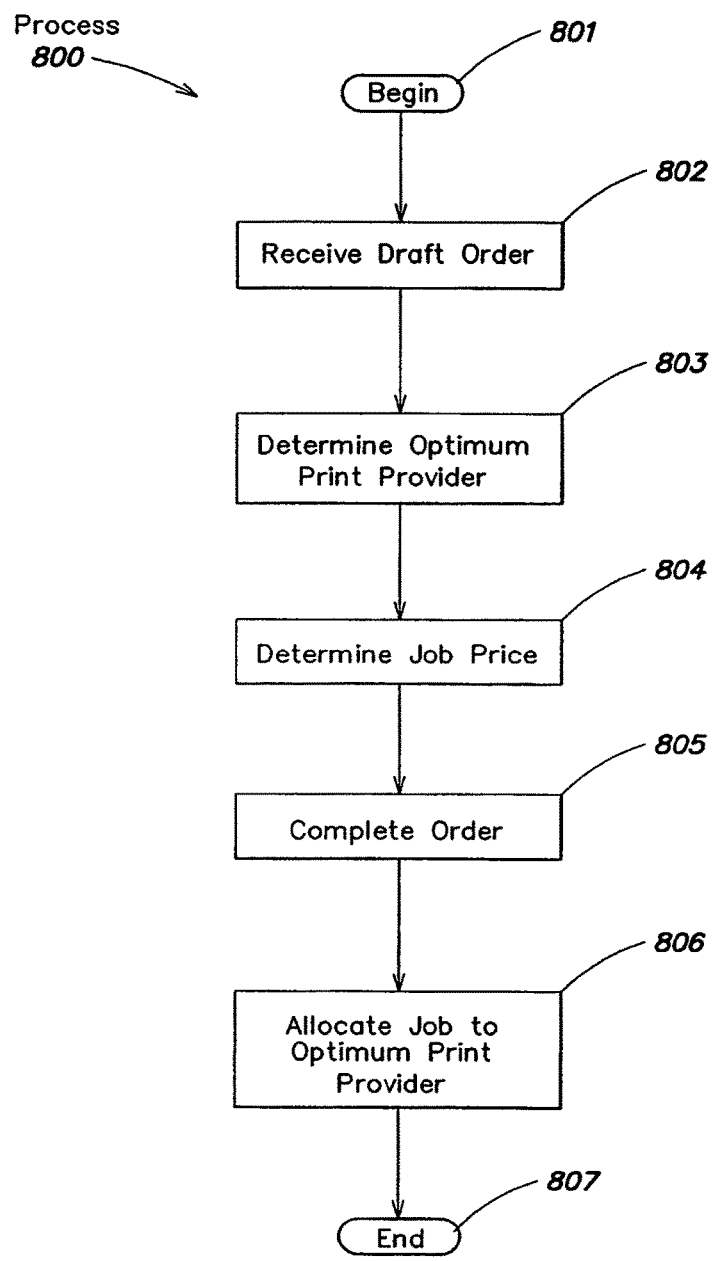
FIG. 8 is a flow chart of a process for processing print orders according to one embodiment of the present invention.

FIG. 8 shows a flow chart of a process for processing print orders according to one embodiment of the present invention. At block 801, process 800 begins. At block 802, the global print system receives a draft order describing a job to be processed by the global print management system (e.g., system 100). As discussed above, the order may include one or more JDF files to be processed.

At block 803, the global print system determines an optimum print provider for producing the submitted order. The optimum print provider may be determined based on a number of parameters, including without limitation, price of production, shipping costs, and location of the print service provider. According to one embodiment, the act of determining an optimum print provider may include determining optimum print providers for portions of the print job. At block 804, the global print system determines a job price for producing the order. This may include, for example, obtaining pricing information from print service providers along with estimated shipping costs from one or more shipping providers. If acceptable to the customer, the global print system completes the order at block 805 and the job is allocated to one or more optimum print providers at block 806. At block 807, process 800 ends.

Figure 9:
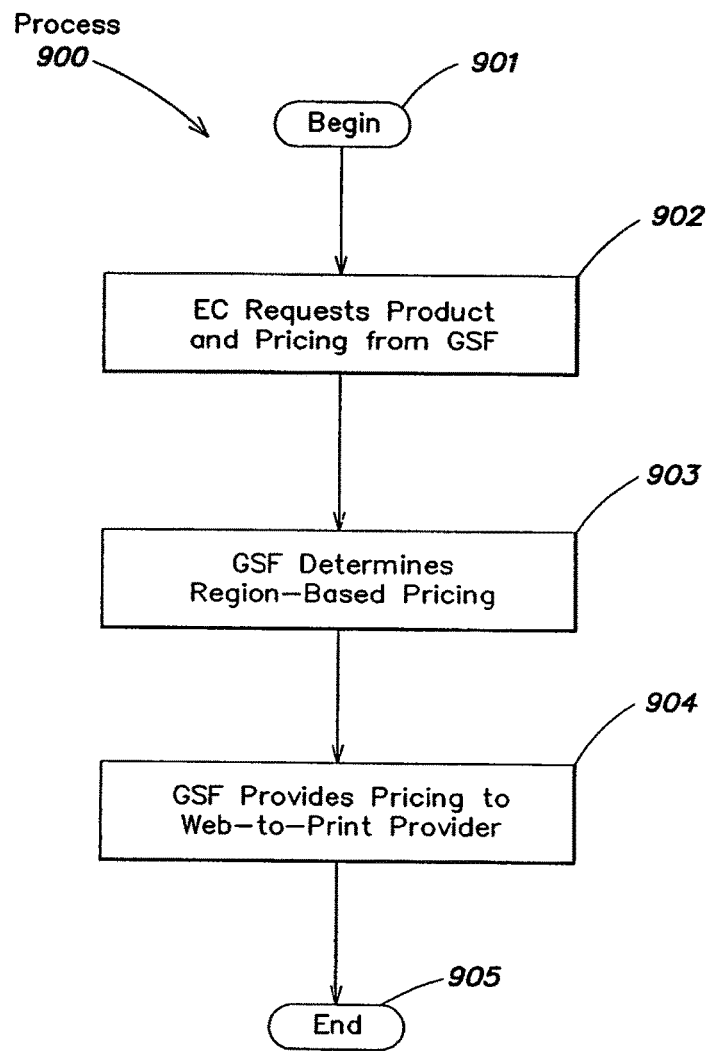
FIG. 9 is a flow chart of a process for determining pricing of a print job according to one embodiment of the present invention.

FIG. 9 shows a flow chart of a process for determining pricing of a print job according to one embodiment of the present invention. According to one aspect of the present invention, a global print system optimizes the selection of print service providers based on their location or region in which they are located. Therefore, for a particular region, a print service provider may be selected based upon the price of production for a particular job. At block 901, process 900 begins. At block 902, an enterprise customer (EC) requests product and its associated pricing from a graphic service provider (GSF). The GSF determines any pricing based on the region in which its located at block 903. At block 904, such pricing information is provided to a web-to print provider such as the system available from Printable Technologies at block 904. Such pricing information may be used by such a web-to print provider in order to determine an optimum allocation of a job or portion thereof to a particular print service provider (PSP). At block 905, process 900 ends.

Figure 10:
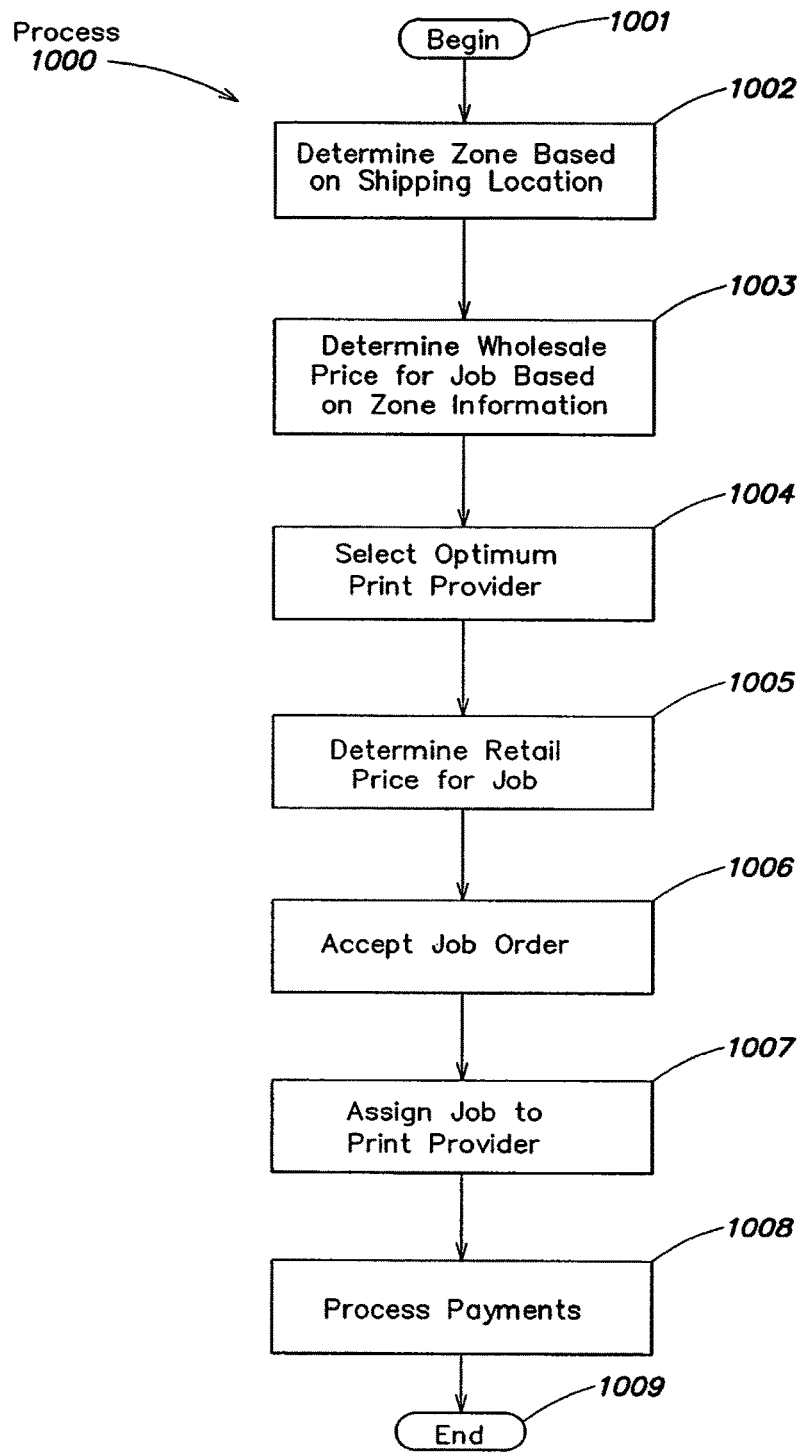
FIG. 10 is a flow chart of a process for allocating print jobs according to one embodiment of the present invention.

FIG. 10 shows a flow chart of a process for allocating print jobs according to one embodiment of the present invention. As discussed above, a PSP may be selected based on a number of factors including the location of the PSP and the cost associated with producing and shipping the product to a particular destination. At block 1001, process 1000 begins. At block 1002, the global print management system determines, for an order entered into the system, a zone based on a shipping location for the printed product. At block 1003, the system determines a wholesale price for producing the print job based on the zone information. At block 1004, an optimum print provider is selected within that zone to produce the job or portion thereof.

At block 1005, the system determines a retail price for the job which, if acceptable to the enterprise customer is accepted at block 1006. At block 1007, the job or a portion thereof is assigned to a particular print service provider for execution. Prior to, during, or after the job has been completed, the system processes payments for the job order at block 1008. At block 1009, process 1000 ends.

Figure 11:
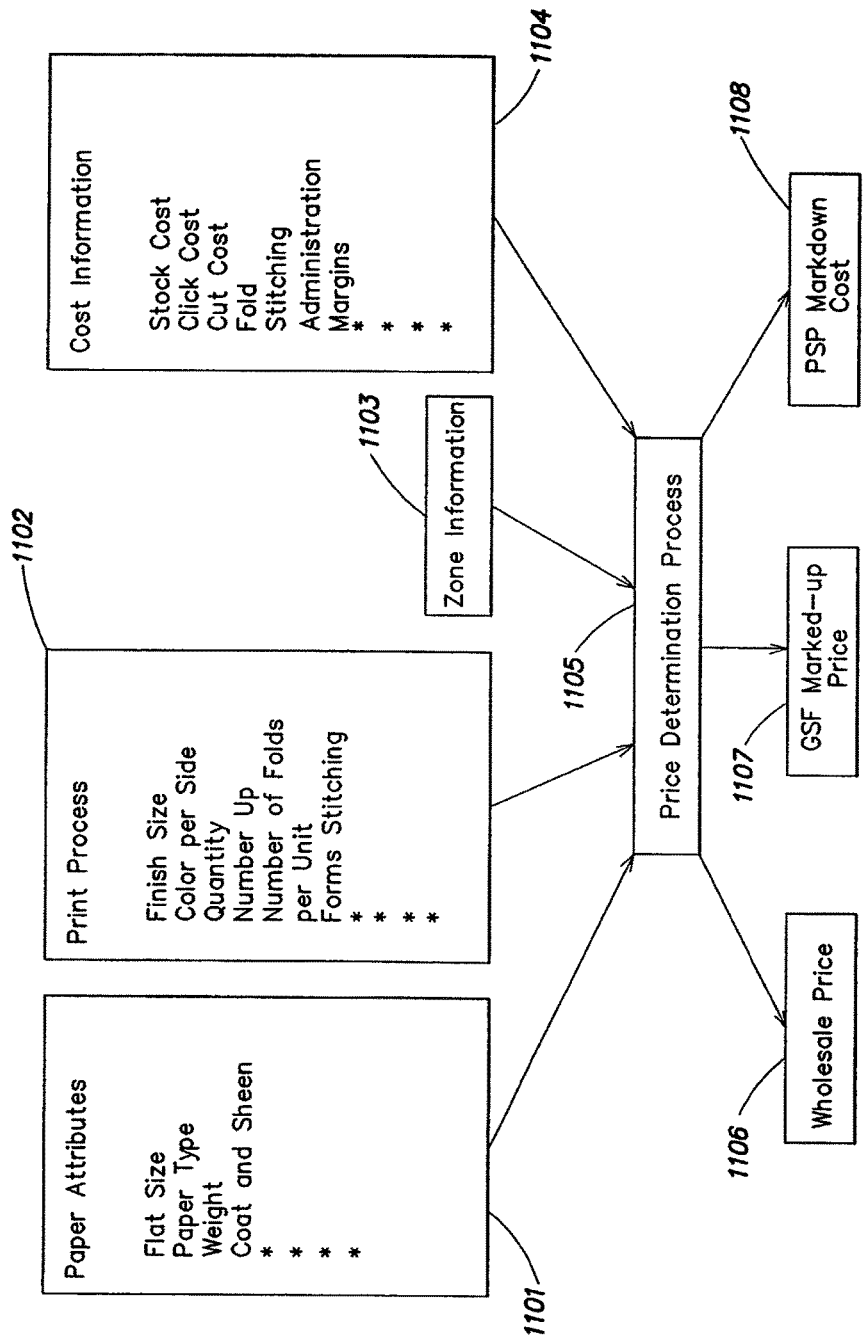
FIG. 11 is a process for determining a price of a print job according to one embodiment of the present invention.

FIG. 11 shows a process for determining a price of a print job according to one embodiment of the present invention. As discussed above, a number of parameters may be used to determine pricing for producing a particular print job. In one embodiment, a price determination process 1105 may be determined at least in part based on parameters such as paper attributes 1101 (e.g., paper type, type, weight, coat, and chain, etc.), print process 1102 (e.g., quantity, number of folds per unit, etc.), zone information 1103, cost information (e.g., stock costs, click costs, etc.). In response, the wholesale price 1106 may be determined for particular jobs based on there parameters. Also, a GSF marked-up price 1107 may be determined which is the cost charged to the GSF to produce the job indicated. Further, a marked-down cost for the PSP (PSP markdown cost 1108) may be determined which is the actual cost of the PSP to produce the job or portion thereof.

Figure 12:
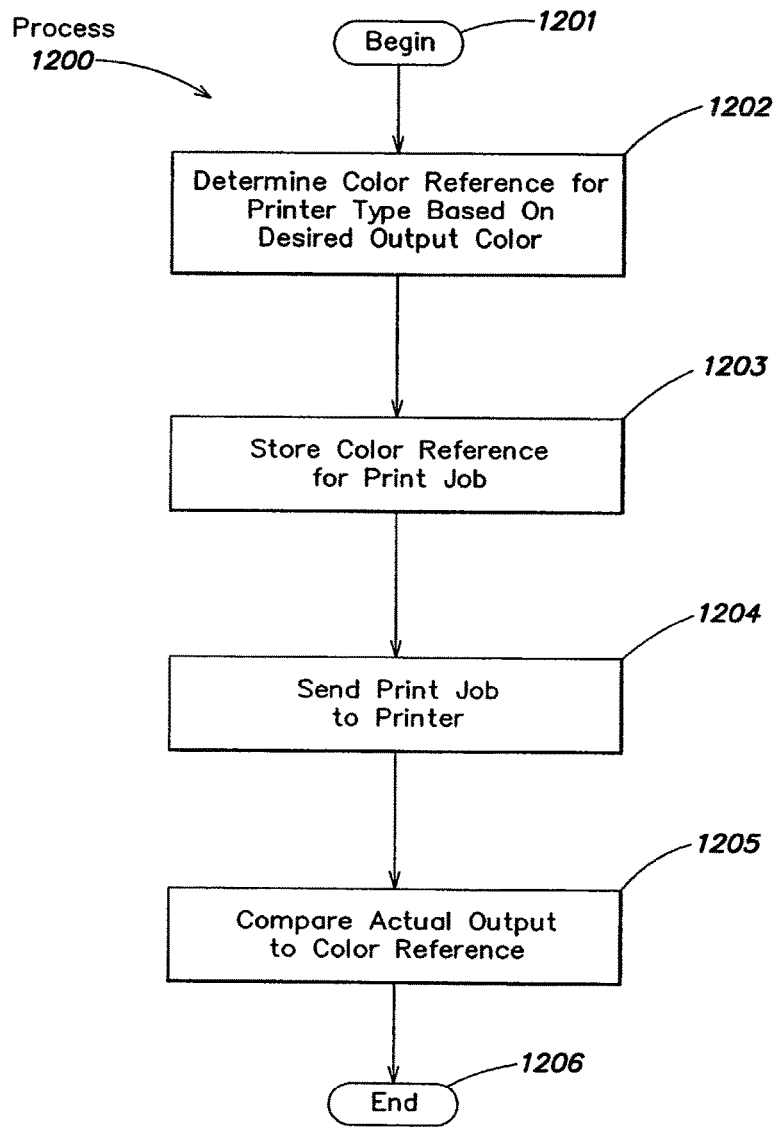
FIG. 12 is a flow chart of a process for determining a color reference according to one embodiment of the present invention.

FIG. 12 shows a flowchart of a process 1200 for determining a color reference according to one embodiment of the present invention. As discussed above, it may be desirable to provide an independent color reference to which various products produced by a multitude of print providers may be compared. Because, according to one embodiment, multiple print providers can be used to produce product associated the a single job, consistency should be maintained between the various print providers.

At block 1201, process 1200 begins. At block 1202, the global print management system determines a color reference for a particular printer type based on a desired output color. Because it is appreciated that different printer types may produce different types of color, an independent color reference is developed to which deviations may be measured. At block 1203, a color reference is stored for a particular print job. At block 1204, the print job is sent to one or more printers to be produced. At block 1205, the actual output is measured and compared to the stored color reference. In one example, the color space may be a design using the well-known ICC standard which reflects potential outputs for a particular digital press (e.g., the well-known HP indigo digital press). However, it should be appreciated that other standards may be used for designing color spaces for other digital press types. Further, actual output color may be measured using a pulse spectrometer as is known in the art. For instance, the well-known MonicoQueue Color client server software may be used to measure compliance with the color reference. Data collected from the client software may be transferred to the MonicoQueue Color system which is then transferred to the global print server so that the quality of the global print process may be monitored. According to one embodiment of the present invention, because of this feedback to the global prints system, error or drift in actual output can be minimized. For instance, according to one embodiment, deltaE in print color is reduced to less than 2-3 deltaE which is at or near what human beings can visually recognize as a difference in color.

Figure 13:
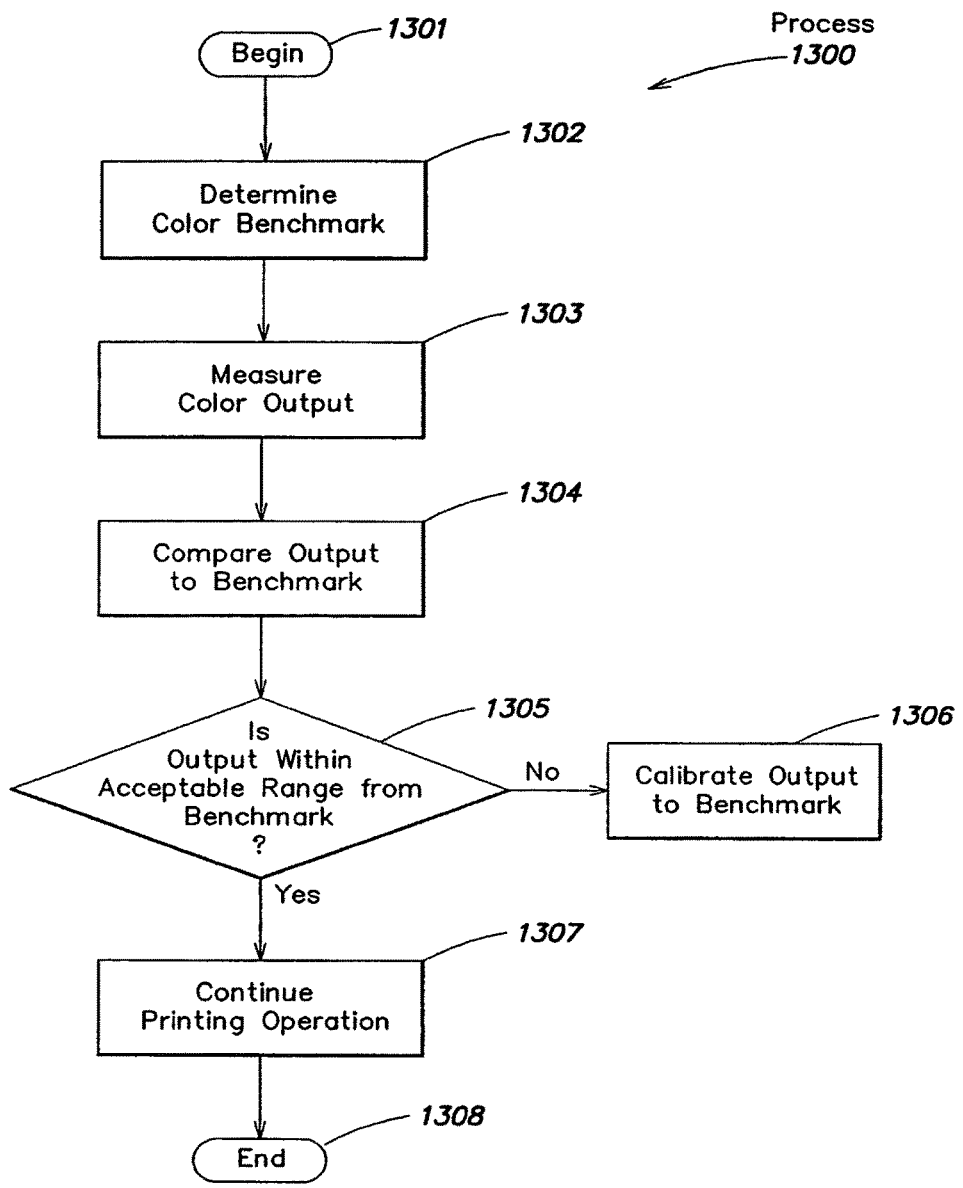
FIG. 13 is a flow chart of a process for using a color benchmark according to one embodiment of the present invention.

FIG. 13 is a flow chart of a process 1300 for using a color benchmark according to one embodiment of the present invention. As discussed above, printers may need to be calibrated from time to time, which may be corrected. According to one embodiment, a benchmark may be provided to which output from a number of different printer types may be compared and calibrated. At block 1301, process 1300 begins. At block 1302, a color benchmark is determined to which a standard output is measured. At block 1303, the output of a particular printer type is measured. As discussed above, such output may be measured using a pulse spectrometer. At block 1304, the color output which is measured is compared to the determined benchmark.

If, at block 1305 is determined that the output is within an acceptable range of the benchmark, printing operations are continued at block 1307. If not, the printer is calibrated so that the output is within an acceptable tolerance of the benchmark at block 1306. At block 1308, process 1300 ends.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for printing in a distributed communications network, the network comprising a plurality of enterprise customers that are capable of submitting at least one print job to a distributed print provider over a global network, the method comprising acts of:
receiving, on a computer system of the distributed print provider via a print job interface provided over at least one network communication interface, a print job from at least one of the plurality of enterprise customers, wherein the print job includes a plurality of attributes for the print job, the plurality of attributes including: a number of physical products to be produced, at least one destination address to which a plurality of physical products resulting from the print job are to be shipped, and a set of product attributes for the plurality of physical products;
dividing, by the computer system, the print job into a plurality of portions, each portion of the print job to be performed by a respective service provider of a plurality of available service providers distinct from the distributed print provider, wherein each portion of the print job corresponds to production of a unique subset of the plurality of physical products, and wherein the plurality of portions of the print job result in production of the number of physical products having the set of product attributes;
allocating, by the computer system, at least one first portion of the print job to a first service provider;
allocating, by the computer system, at least one second portion of the print job to a second service provider;
preparing, by the computer system, job performance data for each service provider allocated at least a portion of the print job, wherein the preparing includes generating job definition data for use by the respective service provider in producing the subset of the plurality of physical products, wherein the job definition data for each respective service provider is configured according to a set of attributes of production equipment of the respective service provider, and wherein the job definition data ensures a desired quality of at least one of the set of product attributes for all of the plurality of physical products; and
forwarding, by the computer system via at least one network communication interface, the job performance data for each portion of the print job for use by the respective service provider in performing the corresponding at least one portion of the print job for the distributed print provider, wherein the job performance data further includes a destination address from the at least one destination address to which the subset of the plurality of physical products for the corresponding at least one portion of the print job are to be shipped.

2. The method according to claim 1, wherein the acts of allocating are performed transparently to the at least one of the plurality of enterprise customers.

3. The method according to claim 1, wherein the act of allocating the at least one first portion of the print job is in response to pricing information provided by the first service provider.

4. The method according to claim 1, wherein the act of allocating the at least one first portion of the print job is in response to an act of determining a shipping zone associated with the at least one first portion of the print job.

5. The method according to claim 1, wherein the act of allocating the at least one first portion of the print job is in response to an act of determining an availability of the first service provider to produce the at least one first portion of the print job.

6. The method according to claim 1, wherein the act of allocating the at least one first portion of the print job is in response to an act of determining a relative location of the first service provider to a destination of the at least one first portion of the print job.

7. The method according to claim 1, wherein the act of allocating the at least one first portion of the print job is in response to an act of determining a shipping time for shipping the at least one first portion of the print job to a destination.

8. A system comprising:
a set of computing devices configured to:
receive on behalf of a distributed production provider, via at least one network communication interface, requested production job data corresponding to a production job to be performed for a customer, wherein the requested production job data includes a plurality of attributes for the production job, the plurality of attributes including a number of physical products to be produced and at least one destination address to which a plurality of physical products resulting from the production job are to be shipped;
select a first production location of a plurality of available production locations to perform at least a portion of the production job, wherein the first production location is distinct from the distributed production provider;
generate job performance data corresponding to the production job for use by the first production location in performing the at least a portion of the production job, wherein generating the job performance data includes generating modified production job data from at least some of the requested production job data based on production equipment of the first production location, wherein the modified production job data reduces an amount of variance in at least one attribute of the physical products produced by the production equipment of the first production location from a benchmark for each of the at least one attribute that would result from use of the requested production job data by the production equipment of the first production location; and
forward the job performance data for use by the first production location in performing the production job, wherein the job performance data includes the at least one destination address to which at least a portion of plurality of physical products are to be shipped.

9. The system of claim 8, wherein the production job is a print job to be printed and wherein the modified production job data reduces an amount of variance in the color output of the first production location from a color benchmark.

10. The system of claim 9, wherein the amount of variance is reduced to at or near what human beings can visually recognize as a difference in color.

11. The system of claim 8, wherein the plurality of attributes includes a plurality of distinct destination addresses, to each of which a portion of the plurality of physical products is to be shipped.

12. The system of claim 11, wherein the set of computing devices are further configured to:

select a second production location of the plurality of available production locations, distinct from the first production location, to perform a second portion of the production job, wherein each of the first and second production locations are selected at least in part based on a corresponding one of a plurality of distinct destination addresses to each of which a subset of the plurality of physical products are to be shipped;

generate second job performance data corresponding to the production job for use by the second production location in performing the second portion of the production job; and forward the second job performance data for use by the second production location in performing the second portion of the production job.

13. The system of claim 8, wherein the first production location is selected to minimize at least one of: shipping distance, shipping costs, or production costs.

14. A computer-implemented method for producing physical products in a communications network, the method comprising acts of:

receiving, on a computer system of a distributed production provider including a set of computing devices via a production job interface provided over at least one network communication interface, production job data corresponding to a production job to be performed for a customer, wherein the production job data includes a plurality of attributes for the production job, the plurality of attributes including a number of physical products to be produced and at least one destination address to which the plurality of physical products resulting from the production job are to be shipped;

the computer system dividing the production job into a plurality of portions, each portion of the production job to be performed at a respective production location of a plurality of available production locations distinct from the distributed production provider, wherein each portion corresponds to production of a unique subset of the plurality of physical products, and wherein the plurality of portions result in production of the number of physical products;

the computer system preparing job performance data for each production location allocated at least a portion of the production job, wherein the preparing includes generating job definition data for use by the respective production location in producing the subset of the plurality of physical products, wherein the job definition data for each respective production location is configured according to a set of attributes of production equipment of the respective production location, and wherein the job definition data ensures a desired quality for all of the plurality of physical products; and the computer system forwarding the job performance data for each portion of the plurality of portions for use by the respective production location in performing the corresponding portion of the production job, wherein the job performance data further includes a destination address from the at least one destination address to which the subset of the plurality of physical products for the corresponding portion of the production job are to be shipped.

15. The method of claim 14, wherein the production job is a print job to be printed.

16. The method of claim 14, further comprising an act of the computer system selecting the respective production location for each portion of the production job based at least in part on a destination address to which the subset of the plurality of physical products are to be shipped.

17. The method of claim 14, further comprising an act of the computer system modifying at least some of the production job data for at least one portion of the production job based on the respective production location performing the corresponding portion of the production job, wherein the modified at least some of the production job data reduces an amount of variance in the physical products produced by each of the respective production locations.

18. A computer-implemented method for producing physical products in a communications network, the method comprising acts of:

receiving, on a computer system of a distributed production provider including a set of computing devices via a production job interface provided over at least one network communication interface, requested production job data corresponding to a production job to be performed for a customer, wherein the requested production job data includes a plurality of attributes for the production job, the plurality of attributes including a number of a plurality of physical products to be produced and at least one destination address to which the plurality of physical products resulting from the production job are to be shipped;

the computer system selecting a first production location of a plurality of available production locations to perform at least a portion of the production job, wherein the first production location is distinct from the distributed production provider;

the computer system generating job performance data corresponding to the production job for use by the first production location in performing the production job, wherein generating the job performance data includes generating modified production job data from at least some of the requested production job data based on production equipment of the first production location, wherein the modified production job data reduces an amount of variance in at least one attribute of the physical products produced by the production equipment of the first production location from a benchmark for each of the at least one attribute that would result from use of the requested production job data by the production equipment of the first production location; and the computer system forwarding the job performance data for use by the first production location in performing the production job, wherein the job performance data includes the at least one destination address to which at least a portion of the plurality of physical products are to be shipped.

19. The method of claim 18, wherein the production job is a print job to be printed and wherein the modified production job data reduces an amount of variance in the color output of the first production location from a color benchmark.

20. The method of claim 18, further comprising the acts of:

the computer system selecting a second production location, distinct from the first production location, of the plurality of available production locations to perform a second portion of the production job, wherein each of the first and second production locations are selected at least in part based on a corresponding one of a plurality of distinct destination addresses to which a corresponding portion of the plurality of physical products is to be shipped;

the computer system generating second job performance data corresponding to the production job for use by the second production location in performing the production job; and the computer system forwarding the second job performance data for use by the second production location in performing the second portion of the production job.

* * * * *